(12) United States Patent
Wiseman et al.

(10) Patent No.: US 11,159,712 B2
(45) Date of Patent: Oct. 26, 2021

(54) RANGE DIFFERENTIATORS FOR AUTO-FOCUSING IN OPTICAL IMAGING SYSTEMS

(71) Applicant: Orbotech Ltd., Yavne (IL)

(72) Inventors: Shai Wiseman, Rehovot (IL); Yigal Katzir, Rishon Lezion (IL); Ofir Shnit, Moshav Kochav Michael (IL); Ilia Lutsker, Kfar Saba (IL); Chay Goldenberg, Tel Aviv (IL)

(73) Assignee: Orbotech Ltd., Yavne (IL)

( * ) Notice: Subject to any disclaimer, the term of this patent is extended or adjusted under 35 U.S.C. 154(b) by 149 days.

(21) Appl. No.: 16/282,766

(22) Filed: Feb. 22, 2019

(65) Prior Publication Data

US 2019/0266693 A1    Aug. 29, 2019

Related U.S. Application Data

(60) Provisional application No. 62/634,870, filed on Feb. 25, 2018.

(51) Int. Cl.
| | |
|---|---|
| *G01B 11/25* | (2006.01) |
| *G02B 7/09* | (2021.01) |
| *G02B 7/28* | (2021.01) |
| *G06T 1/00* | (2006.01) |
| *G06T 7/50* | (2017.01) |
| *H04N 5/225* | (2006.01) |
| *H04N 5/232* | (2006.01) |

(52) U.S. Cl.
CPC ... *H04N 5/232127* (2018.08); *G01B 11/2518* (2013.01); *G02B 7/09* (2013.01); *G06T 1/0007* (2013.01); *G06T 7/50* (2017.01); *H04N 5/23218* (2018.08); *H04N 5/232125* (2018.08)

(58) Field of Classification Search
None
See application file for complete search history.

(56) References Cited

U.S. PATENT DOCUMENTS

| | | | |
|---|---|---|---|
| 8,154,718 B2* | 4/2012 | Graf | G01N 21/9501 356/237.5 |
| 8,743,195 B2* | 6/2014 | Najmabadi | G02B 21/367 348/79 |

(Continued)

FOREIGN PATENT DOCUMENTS

| | | | | |
|---|---|---|---|---|
| KR | 20140045331 A | * | 4/2014 | G02B 21/244 |
| WO | 2007086378 A1 | | 8/2007 | |
| WO | 2015066420 A1 | | 5/2015 | |

OTHER PUBLICATIONS

Zahniser, Michael, International Patent Application Publication No. WO 2012/105966 A1 (Year: 2012).*

(Continued)

*Primary Examiner* — Soo Shin
(74) *Attorney, Agent, or Firm* — Hodgson Russ LLP

(57) ABSTRACT

A range differentiator useful for auto-focusing, the range differentiator including an image generator providing an image of a scene at various physical depths, a depth differentiator distinguishing portions of the image at depths below a predetermined threshold, irrespective of a shape of the portions, and providing a depth differentiated image and a focus distance ascertainer ascertaining a focus distance based on the depth differentiated image.

39 Claims, 14 Drawing Sheets

(56) References Cited

U.S. PATENT DOCUMENTS

| | | | | |
|---|---|---|---|---|
| 8,903,233 B1* | 12/2014 | Huang | ............... | H04N 5/23212 |
| | | | | 396/104 |
| 9,733,486 B2* | 8/2017 | Lelescu | .................. | H04N 9/045 |
| 9,858,649 B2* | 1/2018 | Liang | ........................ | G06T 7/11 |
| 2003/0094586 A1 | 5/2003 | Kurosawa et al. | | |
| 2005/0157204 A1* | 7/2005 | Marks | .............. | H04N 5/232945 |
| | | | | 348/370 |
| 2011/0293179 A1* | 12/2011 | Dikmen | .................. | G06T 5/008 |
| | | | | 382/167 |
| 2013/0335548 A1 | 12/2013 | Kim et al. | | |
| 2015/0189154 A1* | 7/2015 | Laroia | ................ | H04N 5/23212 |
| | | | | 348/345 |
| 2015/0264335 A1* | 9/2015 | Park | ........................ | G02B 7/38 |
| | | | | 348/49 |
| 2015/0381965 A1 | 12/2015 | Atanassov et al. | | |
| 2017/0061603 A1* | 3/2017 | Agashe | ................ | G06K 9/6218 |
| 2018/0073979 A1* | 3/2018 | Cho | .................. | G01N 21/9501 |
| 2018/0114732 A1* | 4/2018 | Bell | .................... | G01N 21/9501 |
| 2018/0227571 A1* | 8/2018 | Page | .................. | G01B 11/2513 |
| 2019/0266693 A1* | 8/2019 | Wiseman | ......... | H04N 5/232125 |

OTHER PUBLICATIONS

Communication dated Nov. 4, 2019 from the European Patent Office in counterpart application No. 19158879.7.
Communication dated Jul. 2, 2019 from the European Patent Office in application No. 19158879.7.
ILPO, Office Action for IL Application No. 264937, dated May 23, 2021.
EPO, Communication pursuant to Article 94(3) EPC for EP Application No. 19158879.7, dated Jul. 5, 2021.

* cited by examiner

1600

RANGE DIFFERENTIATORS FOR AUTO-FOCUSING IN OPTICAL IMAGING SYSTEMS

REFERENCE TO RELATED APPLICATIONS

Reference is hereby made to U.S. Provisional Patent Application No. 62/634,870, entitled RANGE DIFFERENTIATORS FOR AUTO-FOCUSING IN OPTICAL IMAGING SYSTEMS, filed Feb. 25, 2018, the disclosure of which is hereby incorporated by reference and priority of which is hereby claimed, pursuant to 37 CFR 1.78(a)(4) and 5(i).

FIELD OF THE INVENTION

The present invention relates generally to optical imaging systems and more particularly to systems and methods useful for auto-focusing in optical imaging systems.

BACKGROUND OF THE INVENTION

Various types of auto-focusing systems for use in optical imaging systems are known in the art.

SUMMARY OF THE INVENTION

The present invention seeks to provide systems and methods relating to depth range differentiation for use in auto-focusing in optical imaging systems.

There is thus provided in accordance with a preferred embodiment of the present invention a range differentiator useful for auto-focusing, the range differentiator including an image generator providing an image of a scene at various physical depths, a depth differentiator distinguishing portions of the image at depths below a predetermined threshold, irrespective of a shape of the portions, and providing a depth differentiated image and a focus distance ascertainer ascertaining a focus distance based on the depth differentiated image.

In accordance with a preferred embodiment of the present invention the image generator includes a feature specific illuminator for illuminating the scene during acquisition of the image. Additionally, the depth differentiator is operative to distinguish between the portions of the image at depths below the predetermined threshold and portions of the image at depths at or above the predetermined threshold based on differences in optical properties therebetween, under illumination by the feature specific illuminator.

In accordance with a preferred embodiment of the present invention the feature specific illuminator includes a UV illumination source and the depth differentiator is operative to distinguish between the portions of the image based on differences in fluorescence therebetween. Alternatively, the feature specific illuminator includes dark field and bright field illumination sources and the depth differentiator is operative to distinguish between the portions of the image based on differences in reflectance therebetween.

Preferably, the focus distance ascertainer is operative to ascertain the focal distance based on one of the portions of the image at depths below the predetermined threshold and the portions of the image at a depth at or above the predetermined threshold.

In accordance with a preferred embodiment of the present invention the range differentiator also includes an image focus analyzer operative to provide a focus score based on portions of the image at a depth at or above the predetermined threshold and the focus distance ascertainer is operative to ascertain the focus distance based on the focus score. Additionally, the image focus analyzer includes an illuminator for illuminating the scene with illumination for enhancing an imaged texture of the portions of the image at a depth at or above the predetermined threshold. Additionally, the illuminator includes a dark field illuminator. Alternatively or additionally, the focus score is assigned irrespective of a shape of the portions. In accordance with a preferred embodiment of the present invention the focus score is individually assigned for each pixel corresponding to the portions of the image at a depth at or above the predetermined threshold.

Preferably, the portions of the image at a depth at or above the predetermined threshold are machine identifiable.

In accordance with a preferred embodiment of the present invention the image generator includes a camera and the depth differentiated image includes a two-dimensional image of the scene. Additionally or alternatively, the image generator includes a plenoptic camera and the depth differentiated image includes a three-dimensional image of the scene. In accordance with a preferred embodiment of the present invention the feature specific illuminator includes a dark field illuminator.

In accordance with a preferred embodiment of the present invention the image generator includes a projector projecting a repeating pattern onto the scene and the depth differentiator includes a phase analyzer operative to analyze shifts in phase of the repeating pattern and derive a map of the physical depths based on the shifts in phase, the map forming the depth differentiated image. Additionally, the focus distance ascertainer is operative to ascertain the focus distance based on at least one of the physical depths.

In accordance with a preferred embodiment of the present invention the repeating pattern includes at least one of a sinusoidal repeating pattern and a binary repeating pattern. Additionally, the repeating pattern has a sufficiently low spatial frequency such that the phase analyzer is operative to uniquely correlate the shifts in phase to the physical depths. Additionally or alternatively, the map of the physical depths is one of a two dimensional map and a three dimensional map.

There is also provided in accordance with another preferred embodiment of the present invention a range differentiator useful for auto-focusing, the range differentiator including an image generator providing an image of a scene at various physical depths, a depth differentiator distinguishing portions of the image at depths below a predetermined threshold, an image focus analyzer operative to provide a focus score based on portions of the image at a depth at or above the predetermined threshold and a focus distance ascertainer ascertaining a focus distance based on the focus score.

In accordance with a preferred embodiment of the present invention the image generator includes a feature specific illuminator for illuminating the scene during acquisition of the image. Additionally, the feature specific illuminator includes a UV illumination source and the depth differentiator distinguishes portions of the image based on differences in fluorescence therebetween. Alternatively, the feature specific illuminator includes a combined dark field and bright field illuminator and the depth differentiator distinguishes portions of the image based on differences in reflectance therebetween.

In accordance with a preferred embodiment of the present invention the image focus analyzer includes an illuminator for illuminating the scene with illumination for enhancing an imaged texture of the portions of the image at a depth at or above the predetermined threshold. Additionally, the illuminator includes a dark field illuminator. Additionally or alternatively, the illuminator and the feature specific illuminator share at least one common illumination component.

In accordance with a preferred embodiment of the present invention the focus score is assigned irrespective of a shape of the portions. Additionally or alternatively, the focus score is individually assigned for each pixel corresponding to the portions of the image at a depth at or above the predetermined threshold.

Preferably, the portions of the image at a depth at or above the predetermined threshold are machine identifiable.

There is further provided in accordance with yet another preferred embodiment of the present invention a range differentiator useful for auto-focusing, the range differentiator including a target identifier including a user interface enabling a user to identify a machine identifiable feature of an object in an image, a feature detector operative to identify at least one occurrence of the machine identifiable feature in an image irrespective of a shape of the feature and a focus distance ascertainer ascertaining a focal distance to the machine identifiable feature.

Preferably, the range differentiator also includes a feature specific illuminator for illuminating the object during acquisition of the image.

In accordance with a preferred embodiment of the present invention the feature specific illuminator includes a UV illumination source and the feature identifier identifies the machine identifiable feature based on fluorescence thereof. Alternatively, the feature specific illuminator includes a combined dark field and bright field illuminator and the feature identifier identifies the machine identifiable feature based on reflectance thereof.

In accordance with a preferred embodiment of the present invention range ascertainer includes an illuminator for illuminating the object with illumination for enhancing an imaged texture of the feature of the object in the image. Additionally, the illuminator includes a dark field illuminator.

Preferably, the illuminator and the feature specific illuminator share at least one common illumination component.

In accordance with a preferred embodiment of the present invention the feature of the object includes a conductive feature. Additionally, the feature of the object includes an indent in the conductive feature.

There is yet further provided in accordance with still another preferred embodiment of the present invention a range differentiator useful for auto-focusing, the range differentiator including a first image generator including a first imaging modality and providing a first image of a scene at various physical depths, a depth differentiator distinguishing portions of the first image at depths below a predetermined threshold and providing a depth differentiated image, a focus distance ascertainer ascertaining a focal distance based on the depth differentiated image and a second image generator including a second imaging modality and providing a second image of the scene automatically focused at the focal distance.

In accordance with a preferred embodiment of the present invention the first imaging modality includes combined bright and dark field illumination and the second imaging modality includes dark field illumination. Additionally, the second image generator includes a plenoptic camera.

In accordance with a preferred embodiment of the present invention the first imaging modality includes dark field illumination and the second imaging modality includes combined bright and dark field illumination. Additionally, the first image generator includes a plenoptic camera.

There is still further provided in accordance with still another preferred embodiment of the present invention a range differentiator useful for auto-focusing, the range differentiator including a projector projecting a repeating pattern onto an object including features of various physical depths, a sensor acquiring an image of the object having the repeating pattern projected thereon, a phase analyzer analyzing shifts in phase of the repeating pattern and deriving a map of the physical depths of the features based on the shifts in phase and a focus analyzer ascertaining a focus distance to at least one of the features.

In accordance with a preferred embodiment of the present invention the repeating pattern includes at least one of a sinusoidal repeating pattern and a binary repeating pattern. Additionally or alternatively, the repeating pattern has a sufficiently low spatial frequency such that the phase analyzer is operative to uniquely correlate the shifts in phase to the physical depths.

Preferably, the map of the physical depths is one of a two dimensional map or a three dimensional map.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
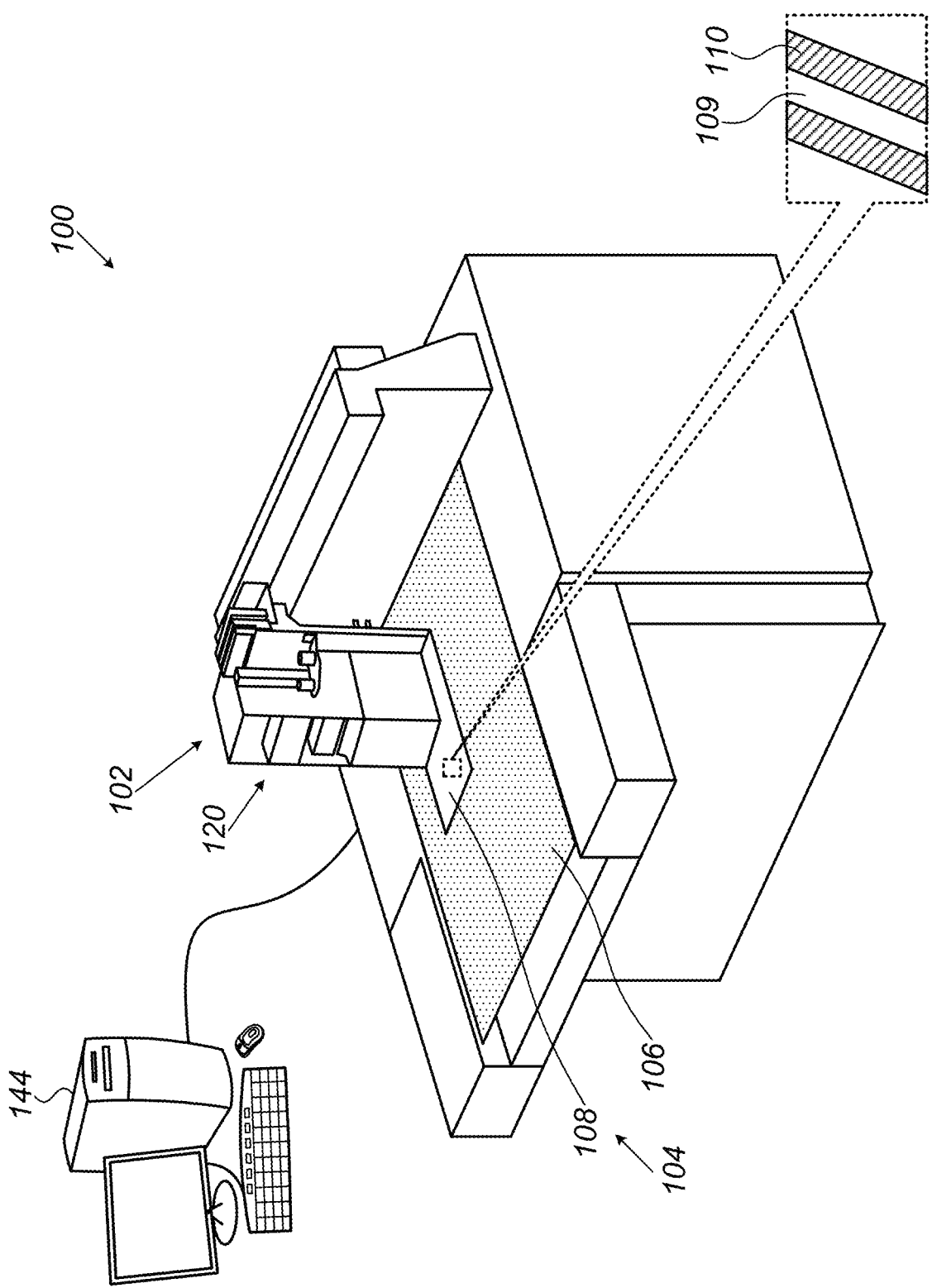
FIG. 1 is a simplified schematic illustration of an optical imaging system including auto-focusing functionality, constructed and operative in accordance with a preferred embodiment of the present invention.
Figure 2:
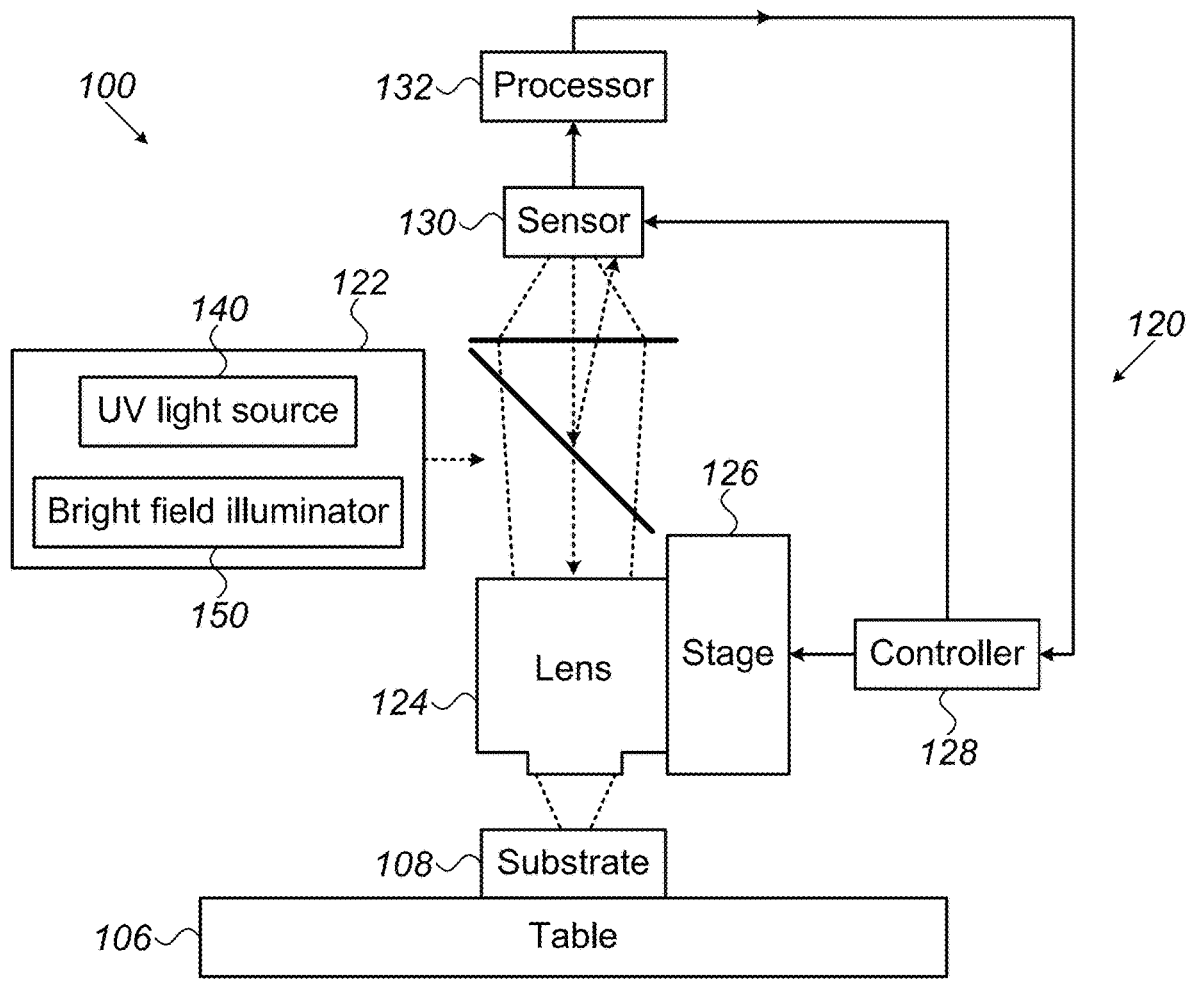
FIG. 2 is a simplified block-diagram representation of elements of a system of the type illustrated in FIG. 1.

Reference is now made to FIG. 1, which is a simplified illustration of an optical imaging system including auto-focusing functionality, constructed and operative in accordance with a preferred embodiment of the present invention, and to FIG. 2, which is a simplified block-diagram representation of elements of a system of the type illustrated in FIG. 1.

As seen in FIGS. 1 and 2, there is provided an optical imaging system 100, preferably including an optical imaging head 102 mounted on a chassis 104. Chassis 104 preferably includes a table 106 adapted for placement thereon of an object 108 to be imaged. Optical imaging system 100 is preferably operative to provide an image of object 108, for example for the purposes of inspection or processing of object 108.

Object 108 is preferably a non-planar object comprising physical features at more than one physical depth. Here, by way of example, object 108 is shown to be embodied as a PCB including a non-conductive substrate 109 having metallic traces 110 formed thereon, which metallic traces 110 may be embedded or may protrude with respect to a surface of substrate 109. It is appreciated, however, that optical imaging head 102 may be used to acquire images of any suitable target or scene having physical features at more than one physical height or depth including, but not limited to, PCBs, wafer dies, assembled PCBs, flat panel displays and solar energy wafers.

In some cases, it may be desirable to generate a focused image of a feature of interest included in object 108, which feature of interest is at a different physical height or depth with respect to other features of object 108. For example, in the case of object 108, it may be desirable to generate an image in which metallic traces 110 are in focus for the purposes of inspection thereof. It is a particular feature of a preferred embodiment of the present invention that optical imaging system 100 includes a range differentiator 120 providing depth differentiated images and thereby enabling auto-focusing on a feature of interest, such as metallic traces 110, notwithstanding the difference in physical depth between the feature of interest and other features, such as substrate 109. Furthermore, such auto-focusing may be achieved by range differentiator 120 irrespective of a shape of the feature of interest.

As seen most clearly in FIG. 2, range differentiator 120 preferably includes an image generator operative to provide an image of a scene at various physical depths, here embodied, by way of example, as including illumination module 122 for illuminating object 108. Illumination provided by illumination module 122 is preferably directed towards object 108 by way of a movable lens portion 124, which moveable lens portion 124 is preferably mounted on a translation stage 126 controlled by a controller 128. Light emanating from object 108 is preferably directed by way of moveable lens portion 124 towards a camera sensor 130, which camera sensor 130 is preferably coupled to a processor 132.

Range differentiator 120 preferably operates in two modes. In a first mode of operation of range differentiator 120, object 108 is preferably imaged by camera sensor 130 under illumination conditions in which the feature of interest is clearly distinguishable from the other features of object 108 having a different physical depth than the feature of interest. Such imaging is preferably carried out following an initial coarse focusing of camera sensor 130 on object 108, such that the image acquired thereby is in sufficiently good focus for subsequent processing.

Illumination under which the feature of interest is clearly distinguishable from the other features of object 108 having a different physical depth than the feature of interest may be termed feature specific illumination and may be provided by a feature specific illuminator 140 included in illumination module 122. Here, by way of example only, feature specific illuminator 140 is shown to be embodied as a UV light source, preferably providing very short wavelength illumination having a wavelength of less than or equal to approximately 420 nm.

Figure 3:
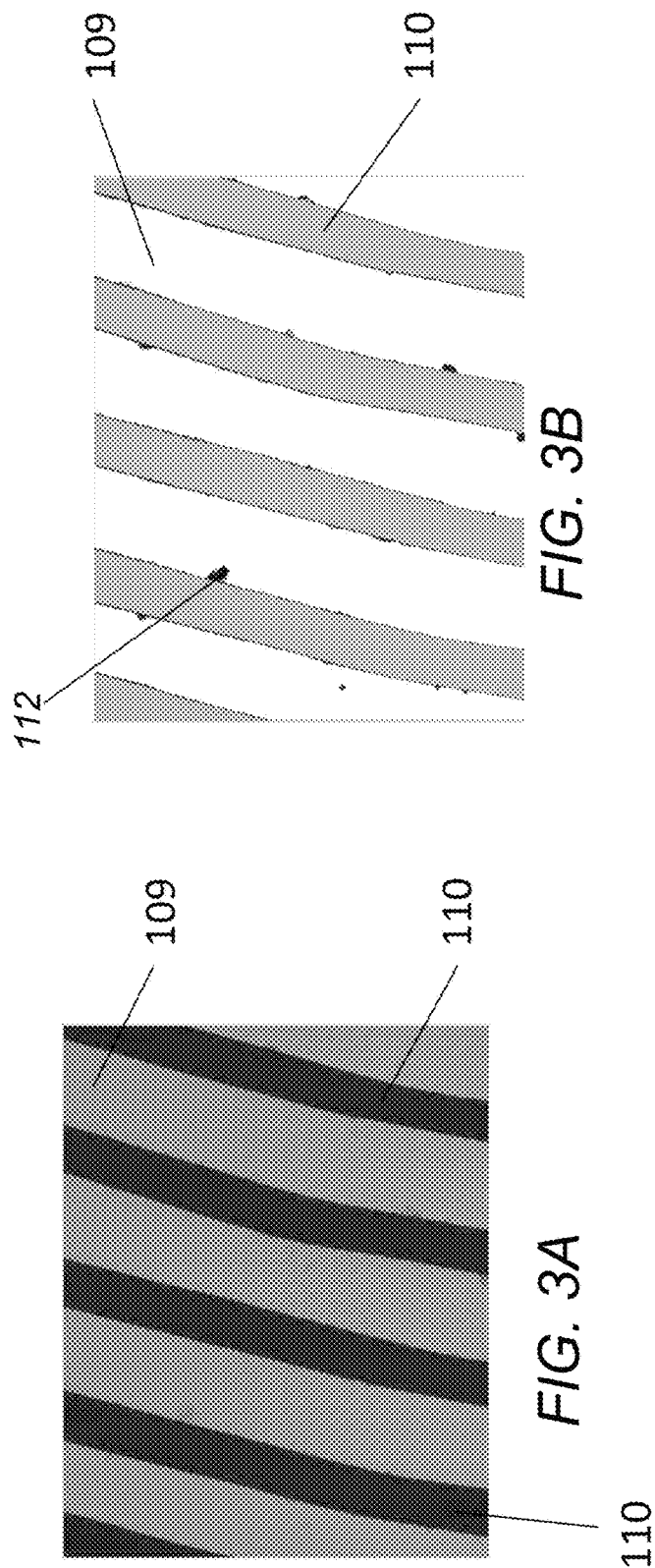
FIGS. 3A, 3B and 3C are simplified images produced by a system of the type illustrated in FIGS. 1 and 2, respectively showing an initial image of an object acquired under feature-specific illumination conditions, a segmented image of the object based on the initial image and useful for autofocusing and an auto-focused image of the object based on the segmented image.

Under UV illumination provided by feature specific illuminator 140, non-conductive substrate 109 fluoresces whereas metallic traces 110 do not. An exemplary image of substrate 109 and metallic traces 110 thereon under UV feature specific illumination conditions is shown in FIG. 3A. As seen in FIG. 3A, non-conductive substrate 109 has a bright appearance due to the fluorescence thereof whereas metallic traces 110 have a dark appearance. Non-conductive substrate 109 is thus clearly distinguishable from metallic traces 110 in the image of FIG. 3A. Furthermore, as a result of the fluorescence of substrate 109, additional features of object 108 that may lie beneath the surface of substrate 109 are masked and thereby do not appear in the image of FIG. 3A, thus simplifying subsequent image processing.

Following the generation of an initial feature specific image, such as that shown in FIG. 3A, a tagged or segmented image is preferably generated, which segmented image is based on the initial feature specific image. An exemplary segmented image based on the feature specific image of FIG. 3A is illustrated in FIG. 3B. In the segmented image of FIG. 3B, pixels corresponding to dark metallic traces 110 are marked in gray, identifying these pixels as corresponding to regions of interest, and pixels corresponding to bright substrate regions 109 are marked in white, identifying these pixels as corresponding to regions of non-interest, which regions of non-interest are to be ignored in subsequent image processing steps. Pixels corresponding to regions of unclear identity are marked in black, such as in a region 112, identifying these pixels as corresponding to regions of questionable interest, which regions are also to be ignored in subsequent image processing steps. Preferably, a predetermined threshold for level of pixel brightness in FIG. 3A may be applied in order to distinguish between dark pixels corresponding to metallic traces 110 and bright pixels corresponding to background substrate 109.

It is understood that the segmented image of FIG. 3B thus effectively forms a depth differentiated mask image, in which portions of the feature specific image of FIG. 3A at or below a given depth, here, by way of example comprising substrate 109, are distinguished from portions of the feature specific image of FIG. 3A above the given depth, here, by way of example, comprising metallic traces 110. It is appreciated that the differentiation between portions of the feature specific image of FIG. 3A at different physical depths is based on the difference in optical properties therebetween, and more specifically the difference in fluorescence under UV illumination therebetween, and is independent and irrespective of the physical shapes of the features.

The generation of the segmented mask image of FIG. 3B may be automatically carried out by computing functionality included in system 100, here embodied, by way of example only, as processor 132, which processor 132 may be included in a computer 144. It is appreciated that processor 132 thus preferably operates as a depth differentiator, operative to distinguish portions of an initial feature specific image, such as the image of FIG. 3A, at depths below a predetermined threshold, irrespective of a shape of the portions, and to provide a depth differentiated image, such as the depth differentiated image of FIG. 3B.

It is further appreciated that feature specific UV illuminator 140 in combination with sensor 130 and processor 132 constitute a particularly preferred embodiment of an image generator, providing an image of object 108 including substrate 109 and metallic traces 110. It is understood, however, that the image generation functionality of range differentiator 120 is not limited to the particular camera and illumination components described herein and rather may comprise any suitable components functional to generate an image of a scene at various physical depths, in which features having different physical depths are differentiable based on the optical properties thereof and irrespective of the shape thereof.

Computer 144 may include a user interface, enabling a user to identify the feature of interest in the feature specific image, such as metallic traces 110 in FIG. 3A. It is appreciated that the feature of interest may be identifiable by a user as well as preferably being a machine identifiable feature, the presence of which machine identifiable feature in the feature specific image may be detected based on the appearance thereof, irrespective of the shape of the feature, by computer 144. It is appreciated that computer 144 therefore may operate both as a target identifier, enabling a user to identify a machine identifiable feature, and as a feature detector, for preferably automatically identifying the machine identifiable feature.

In a second mode of operation of range differentiator 120, following the generation of a segmented image, such as that shown in FIG. 3B, object 108 is preferably imaged by camera sensor 130 under illumination conditions best suited for enhancing the imaged texture of the feature of interest, which feature of interest is here embodied as metallic traces 110. Such illumination may be termed feature focusing illumination and is preferably provided by a feature focusing illuminator 150 included in illumination module 122. Here, by way of example only, feature focusing illuminator 150 is shown to be embodied as a bright field illuminator.

Figure 6:
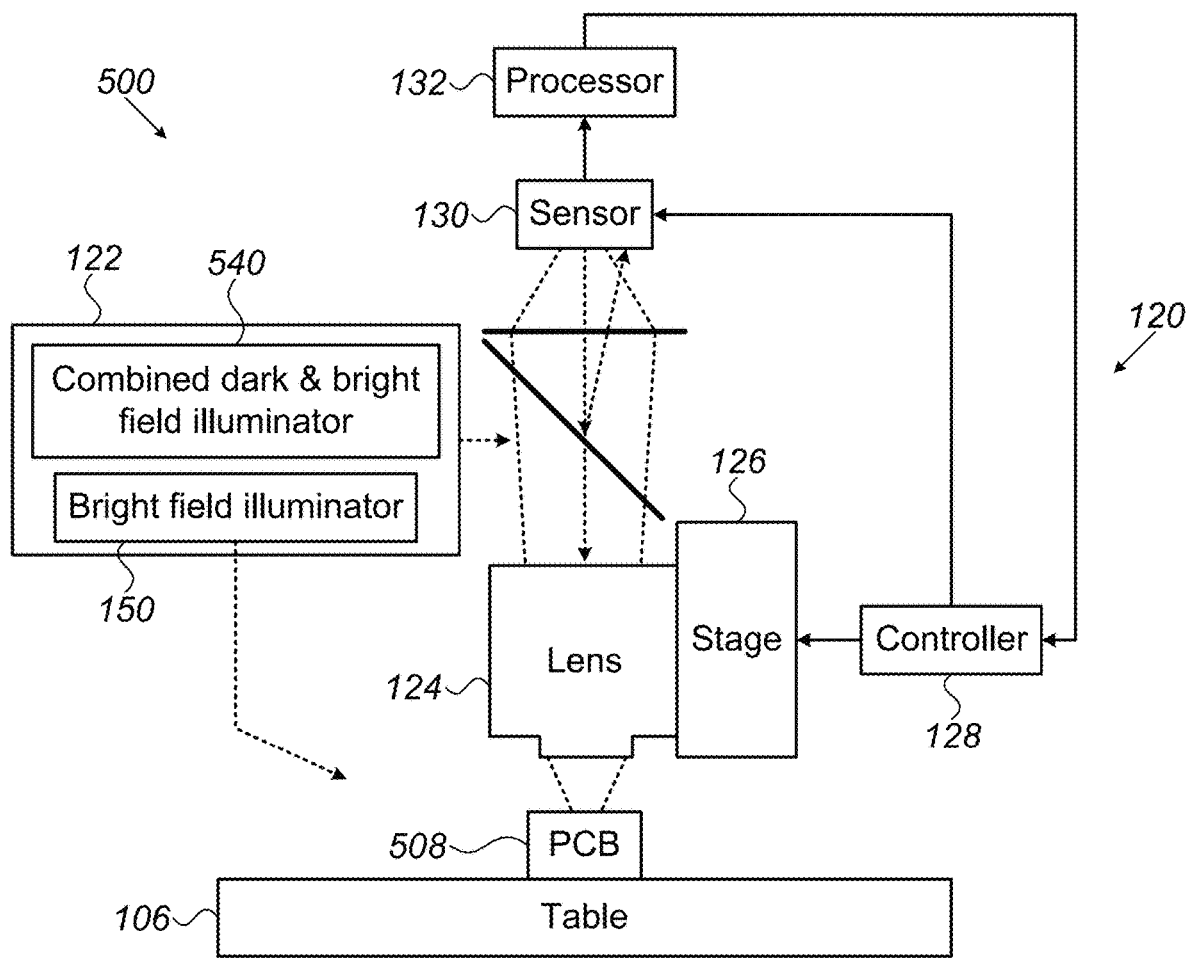
FIG. 6 is a simplified block-diagram representation of elements of a system of the type illustrated in FIG. 5.

It is appreciated that although feature specific illuminator 140 and feature focusing illuminator 150 are shown herein to be embodied as two separate illuminators included in illumination module 122, feature specific illuminator 140 and feature focusing illuminator 150 may alternatively be provided by at least partially common illumination elements having at least partially overlapping functionality, for providing both feature specific and feature focusing illumination, as is exemplified hereinbelow with reference to FIG. 6.

During the imaging of object 108 under lighting provided by feature focusing illuminator 150, the vertical position of lens 124 with respect to object 108 is preferably incrementally shifted, such that a focal height of lens 124 with respect to object 108 is correspondingly adjusted. Adjustment of lens 124 may be controlled by controller 128, which controller 128 is preferably operative to incrementally move stage 126, and thereby lens 124, with respect to object 108. Additionally or alternatively, the focal height of lens 124 with respect to object 108 may be adjusted by way of adjustment to the height of table 106 and/or of optical head 102 in its entirety.

For each position of lens 124, an image of object 108 is preferably acquired by sensor 130. A series of images at a range of focal heights of lens 124 above object 108 is thus preferably generated. An image focus analyzer, preferably embodied as processor 132, is preferably operative to perform image focus analysis on the series of images, in order to provide a focus score based on portions of each image, at a depth at or above a predetermined depth and to ascertain a focus distance based on the focus score. It is appreciated that processor 132 thus additionally preferably operates as a focus distance ascertainer, ascertaining a focus distance based on a depth differentiated image, such as the image of FIG. 3B.

The focus score is preferably calculated for each image acquired under lighting conditions provided by feature focusing illuminator 150, the focus score being based only on those pixels identified in the segmented depth differentiated image, such as the image of FIG. 3B, as corresponding to regions of interest. In the case of metallic traces 110 on substrate 109, by way of example, each pixel identified in the depth differentiated image, such as the image of FIG. 3B, as corresponding to regions of interest, such as metallic traces 110, is assigned a focus measure based on the local texture. Such a focus measure may be, by way of example, the gradient magnitude at the pixel neighborhood, or may be any other focus measure known in the art.

Pixels identified in the depth differentiated image, such as the image of FIG. 3B, as corresponding to regions of non-interest, such as substrate 109, are preferably assigned a focus measure of zero. The overall focus score of each image acquired under lighting conditions provided by feature focusing illuminator 150 is preferably given by the sum of the focus measures of all of the individual pixels in the image corresponding to the region of interest, such as the metallic traces 110. Since the focus measures of pixels corresponding to regions of non-interest, such as substrate 109, is set to zero, pixels corresponding to regions of non-interest do not contribute to the overall focus score of the image and are effectively ignored in the focus score calculation.

It is appreciated that in the above described embodiment the focus score for each image is thus preferably based only on those portions of the image at a depth equal to or above the predetermined depth, in this case corresponding to the depth of metallic traces 110, and does not take into account those portions of the image below the predetermined depth, in this case corresponding to substrate 109. Alternatively, the focus score may be calculated based only on those portions of the depth differentiated image at a depth below a predetermined depth, for example in the case of a feature of interest being embedded within a substrate.

Figure 4:
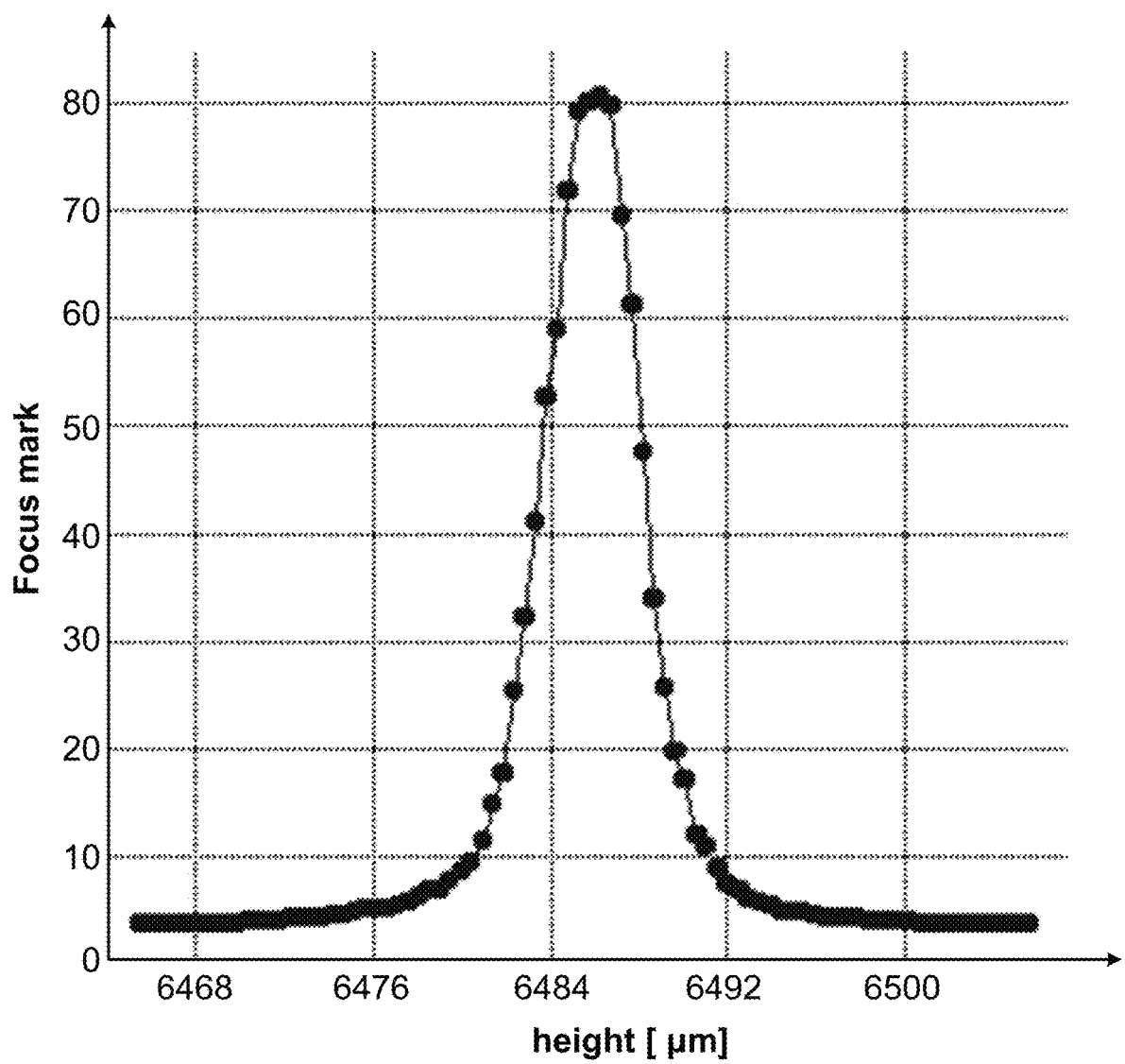
FIG. 4 is a simplified graph illustrating trends in variables useful for generating the auto-focused image of the type shown in FIG. 3C.

The focus score obtained for each image may be plotted as a function of the focal height of lens 124, as illustrated in FIG. 4. The lens position at which the feature of interest is in optimum focus may be identified as that lens position corresponding to the image having the highest focal score. In the case of data presented in FIG. 4, the highest focal score of 80 is seen to correspond to a focal height of approximately 6487 µm. A representative image having the highest focus score, in which metallic traces 110 are in best focus, is seen in FIG. 3C. As appreciated from consideration of the focused image of FIG. 3C, the texture of metallic traces 110 is highly visible whereas substrate 109 appears smooth, since the image of FIG. 3C has been acquired at a focal height optimum for focus on metallic traces 110 without taking into account substrate 109, which substrate 109 is at a different physical height than metallic traces 110.

It is appreciated that the optimum focal height corresponding to the focal height of the image having the highest focus score, is preferably found to an accuracy greater than the height step between consecutive images. This may be achieved by any method suitable for finding the maximum of a function, such as, by way of example only, fitting the data in the region close to the maximum to a parabolic function.

It is further appreciated that the feature specific illumination, preferably provided by feature specific illuminator 140, is not limited to UV illumination and may be any type of illumination under which target features of different physical depths exhibit a correspondingly different optical response and hence may be distinguished between in an image thereof. By way of example, UV feature specific illuminator 140 may be replaced by an alternative illuminator, as seen in the embodiment of FIGS. 5 and 6.

Figure 5:
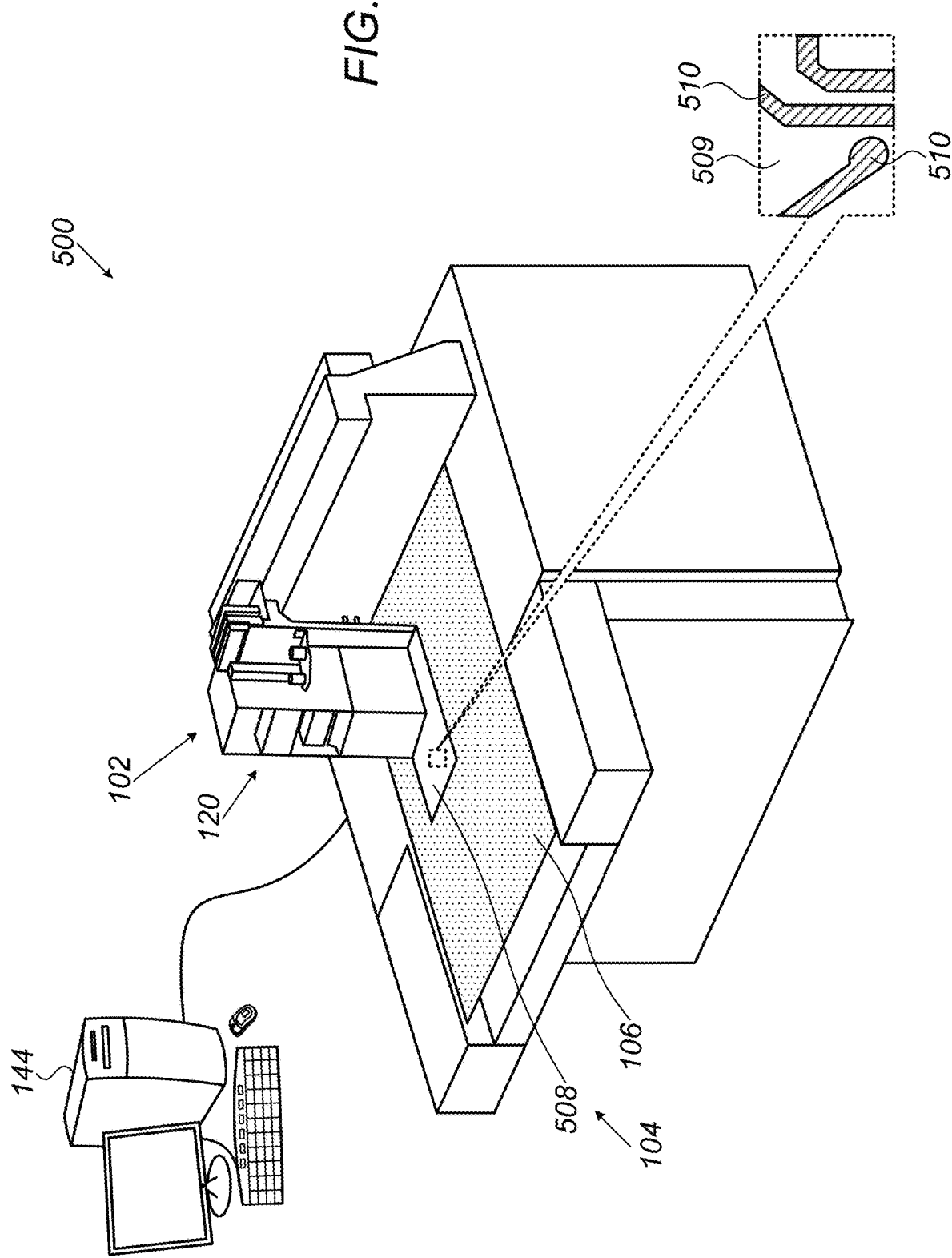
FIG. 5 is a simplified schematic illustration of an optical imaging system including auto-focusing functionality, constructed and operative in accordance with another preferred embodiment of the present invention.

Turning now to FIGS. 5 and 6, an optical imaging system 500 may be provided generally resembling optical imaging system 100 in relevant aspects thereof, with the exception of UV feature specific illuminator 140 of illuminator 122 of range differentiator 120 being replaced by a combined bright and dark field illuminator or broad angle illuminator 540, as seen in FIG. 6. Feature specific illuminator 540 may be of a type generally described in Chinese patent application 201510423283.5, filed Jul. 17, 2015, or other illuminators known in the art.

Here, by way of example only, object 108 is shown to be embodied as a PCB 508 including a laminate region 509 having copper traces 510 formed thereon and protruding with respect thereto. For example, in the case of PCB 508, it may be desirable to generate an image in which copper traces 510 are in focus for the purposes of inspection thereof.

Under combined bright and dark field illumination or broad angle illumination provided by feature specific illuminator 540, laminate region 509 is significantly less reflective than copper traces 510. An exemplary image of laminate region 509 and copper traces 510 under feature specific reflective illumination conditions provided by feature specific illuminator 540 is shown in FIG. 7A. As seen in FIG. 7A, laminate region 509 has a dark appearance due to the lower reflectivity thereof whereas copper traces 510 have a bright appearance. Laminate region 509 is thus clearly distinguishable from copper traces 510 in the image of FIG. 7A. Furthermore, as a result of the opaque appearance of laminate 509, additional features of object 508 that may lie beneath laminate 509 are masked and thereby do not appear in the image of FIG. 7A, thus simplifying subsequent image processing.

Figure 7B:
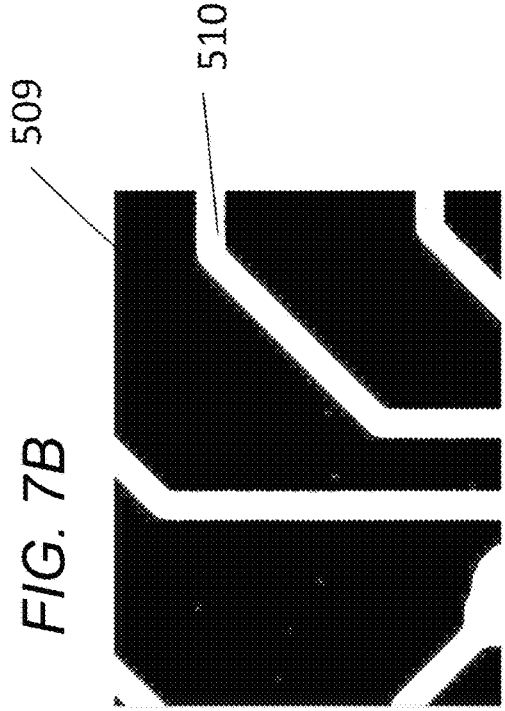
FIGS. 7A, 7B and 7C are simplified images produced by a system of the type illustrated in FIGS. 5 and 6, respectively showing an initial image of an object acquired under feature-specific illumination conditions, a segmented image of the object based on the initial image and useful for autofocusing and an auto-focused image of the object based on the segmented image.
Figure 7A:
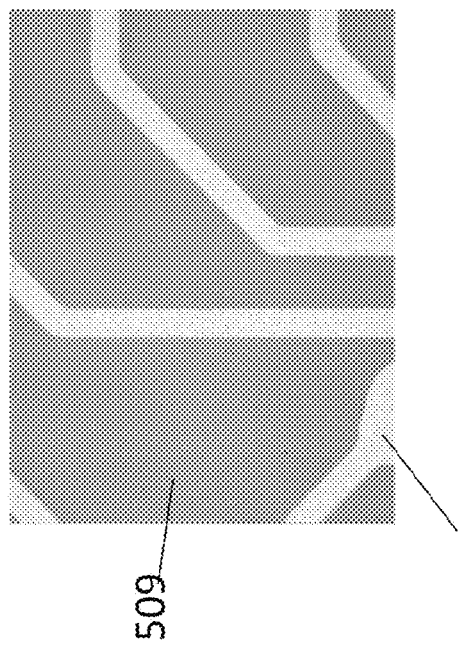

A depth differentiated or segmented image based on the initial feature specific image of FIG. 7A is shown in FIG. 7B. In the segmented image of FIG. 7B, pixels corresponding to bright copper traces 510 are marked in white, identifying these pixels as corresponding to regions of interest, and pixels corresponding to dark laminate region 509 are marked in black, identifying these pixels as corresponding to regions of non-interest, which regions of non-interest are to be ignored in subsequent image processing steps. Preferably, a predetermined threshold for level of pixel brightness may be applied in order to distinguish between white pixels corresponding to copper traces 510 and black pixels corresponding to laminate 509.

It is understood that the segmented image of FIG. 7B thus effectively forms a depth differentiated image, in which portions of the feature specific image of FIG. 7A at depths below a given threshold, here, by way of example comprising laminate 509, are distinguished from portions of the feature specific image of FIG. 7A at depths at or above the given threshold, here, by way of example, comprising copper traces 510. It is appreciated that the differentiation between portions of the feature specific image of FIG. 7A at different physical depths is based on the difference in optical properties therebetween, and more specifically the difference in reflectance under combined bright and dark field or broad angle illumination therebetween, and is independent of the physical shapes of the features.

The generation of the segmented mask image of FIG. 7B may be automatically carried out by computing functionality included in system 500, here embodied, by way of example only, as processor 132, which processor 132 may be included in computer 144. It is appreciated that processor 132 thus preferably operates as a depth differentiator within system 500, operative to distinguish portions of an initial feature specific image, such as the image of FIG. 7A, at depths below a predetermined threshold, irrespective of a shape of the portions, and to provide a depth differentiated image based thereon, such as the depth differentiated image of FIG. 7B.

The acquisition of a series of images under illumination conditions provided by feature focusing illumination 150 and the subsequent preferably automated selection of an image in which copper traces 510 are best in focus at an optimal focus distance, based on a comparison of focal scores assigned only to pixels corresponding to copper traces 510 identified in the segmented, depth differentiated image, such as the image of FIG. 7B, is generally as described above with reference to FIGS. 3B-4. Generally in the manner as described hereinabove with reference to FIG. 4, processor 132 within system 500 preferably additionally operates as a focus distance ascertainer, ascertaining a focus distance based on a depth differentiated image, such as the image of FIG. 7B.

Figure 7C:
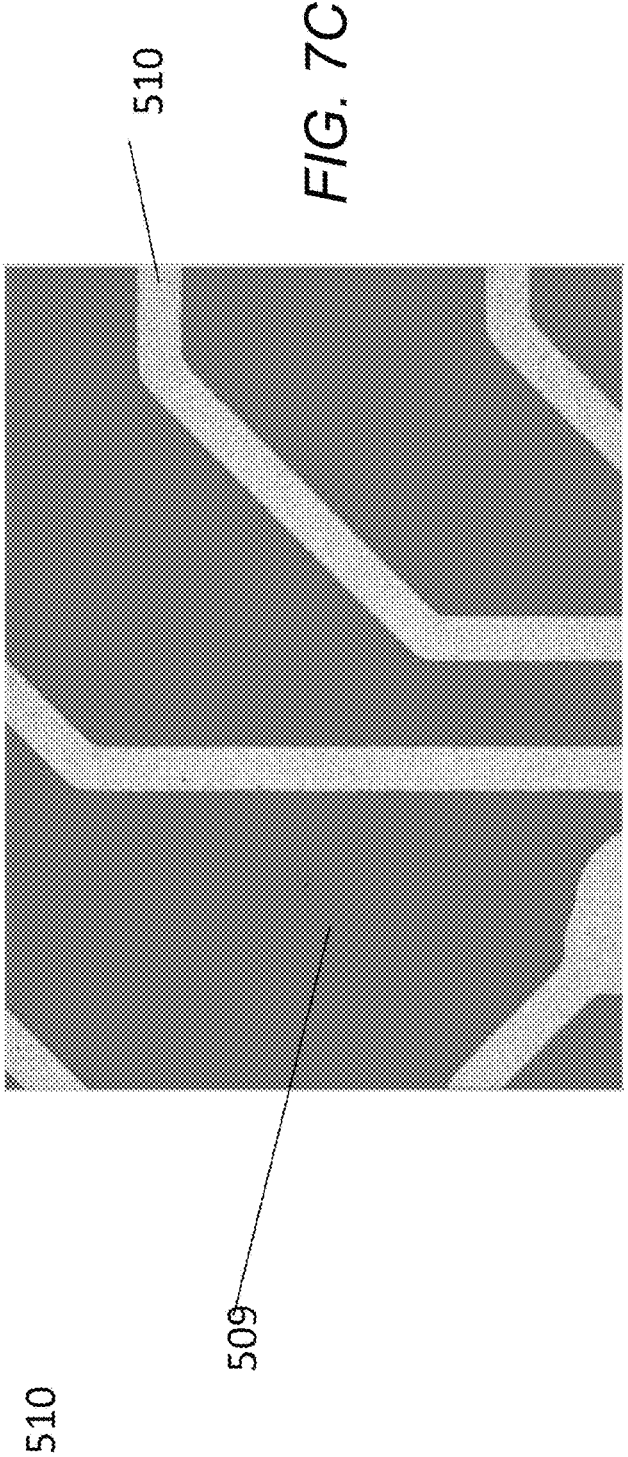

An image of object 508 assigned the highest focus score, in which metallic traces 510 are thus in optimum focus, is seen in FIG. 7C. It is appreciated that the focus score is here preferably calculated based only on those portions of the depth differentiated image, such as the image of FIG. 7B, at a depth at or above a predetermined depth threshold, here corresponding to protruding copper traces 510. Alternatively, the focus score may be calculated based only on those portions of the depth differentiated image at a depth below a predetermined depth threshold, for example in the case of a feature of interest being embedded within a substrate.

It is appreciated that the automatically focused images generated by the systems of FIGS. 1-2 and 5-6, such as images shown in FIGS. 3C and 7C, correspond to images obtained at a focal distance such that a particular feature of interest of the object being imaged is in best focus, notwithstanding the difference in physical height or depth between the particular feature of interest and other features that may form a part of the object being imaged.

However, systems of the present invention may alternatively be operative to automatically generate a range image of an object or scene, in order to obtain a depth profile of a particular feature of interest of the object or scene to be imaged, which feature of interest preferably has a physical depth or height differing from the depth or height of other features forming a part of the object or scene to be imaged.

Figure 8B:
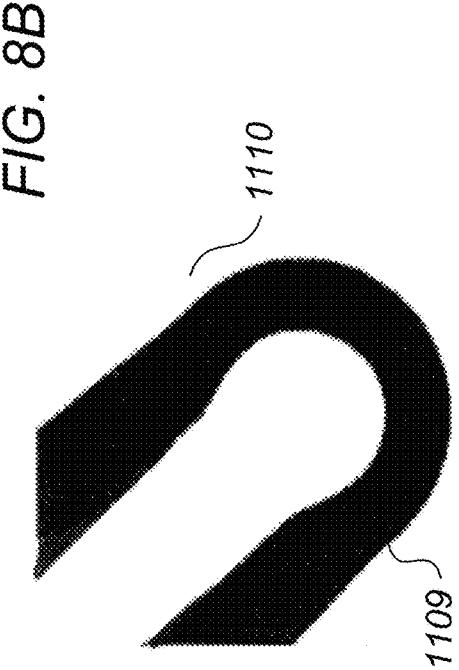
FIGS. 8A, 8B and 8C are simplified images produced by a system of any of FIGS. 1-2 and 5-6, respectively illustrating an initial image of an additional feature acquired under feature-specific illumination conditions, a depth-differentiated image based on the initial image and useful for autofocusing and an auto-focused image based on the depth-differentiated image.
Figure 8A:
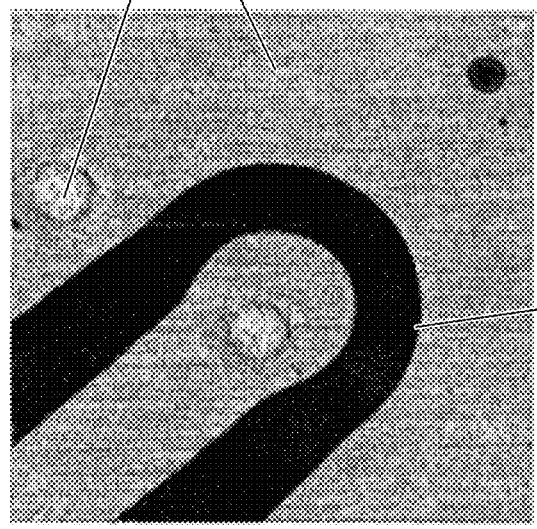
Figure 8C:
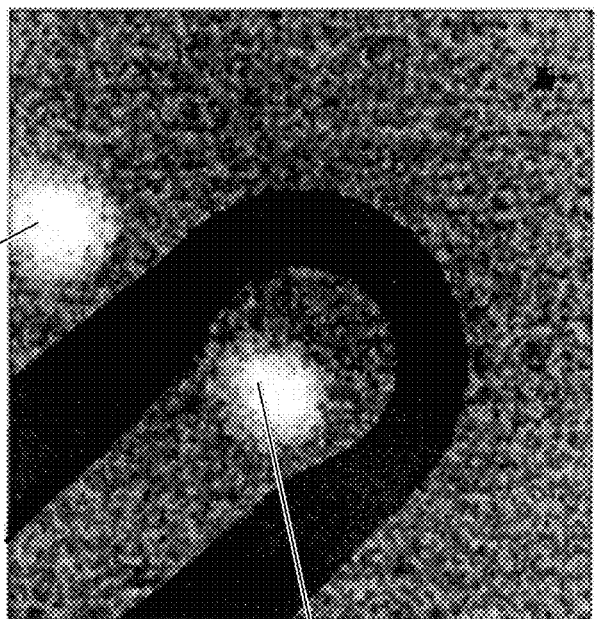

The operation of a system of the type shown in FIGS. 5 and 6 is now described in relation to the generation of a range image of an object 1108. Object 1108 may include a non-conductive substrate 1109 having a copper region 1110 formed thereon, images of which object 1108 are shown in FIGS. 8A-8C. The system of FIGS. 5 and 6 is preferably operative to automatically generate a range image of copper region 1110, which copper region 1110 may protrude or be recessed with respect to substrate 1109. Such a range image may be useful, for example, in detecting the presence and measuring the depth of indents within copper region 1110. It is appreciated that although the generation of a range image is described hereinbelow with reference to the system of FIGS. 5 and 6, any of the systems described hereinabove may alternatively be configured to provide a range image of a feature of interest, with appropriate modifications as will be evident to one skilled in the art.

In the first mode of operation of range differentiator 120 in system 500, object 1108 is preferably imaged by camera sensor 130 under illumination conditions in which the feature of interest is clearly distinguishable from the other features of object 1108 having a different physical depth than the feature of interest. An exemplary image of substrate 1109 and copper region 1110 thereon under feature specific illumination conditions is shown in FIG. 8A. As seen in FIG. 8A, non-conductive substrate 1109 has a dark appearance due to the low reflectance thereof whereas copper region 1110 has a brighter appearance. Non-conductive substrate 1109 is thus clearly distinguishable from copper region 1110 in the image of FIG. 8A. Furthermore, as a result of the opaque appearance of substrate 1109, additional features of object 1108 that may lie beneath substrate 1109 are masked and thereby do not appear in the image of FIG. 8A, thus simplifying subsequent image processing.

Following the generation of an initial feature specific image, such as that shown in FIG. 8A, a depth differentiated or segmented image is preferably generated, which segmented image is based on the initial feature specific image. An exemplary segmented image based on the feature specific image of FIG. 8A is illustrated in FIG. 8B. In the segmented image of FIG. 8B, pixels corresponding to bright copper region 1110 are marked in white, identifying these pixels as corresponding to a region of interest, and pixels corresponding to dark substrate regions 1109 are marked in black, identifying these pixels as corresponding to regions of non-interest, which regions of non-interest are to be ignored in subsequent image processing steps. Preferably, a predetermined threshold for level of pixel brightness may be applied in order to distinguish between bright pixels corresponding to copper region 1110 and dark pixels corresponding to background substrate 1109.

It is understood that the segmented image of FIG. 8B thus effectively forms a depth differentiated image, in which portions of the feature specific image of FIG. 8A at depths below a given threshold, here, by way of example comprising substrate 1109, are distinguishable from portions of the feature specific image of FIG. 8A at depths at or above a given threshold, here, by way of example, comprising copper region 1110.

It is appreciated that the differentiation between portions of the feature specific image of FIG. 8A at different physical depths is based on the difference in optical properties therebetween, and more specifically the difference in reflectance under appropriate illumination therebetween, and is independent of the physical shapes of the features.

The generation of the segmented mask image of FIG. 8B may be automatically carried out by processor 132, which processor 132 may be included in computer 144. It is appreciated that processor 132 thus preferably operates as a depth differentiator, operative to distinguish portions of an initial feature specific image, such as the image of FIG. 8A, at depths below a predetermined threshold, irrespective of a shape of the portions, and to provide a depth differentiated image, such as the depth differentiated image seen in FIG. 8B, based thereon.

It is further appreciated that feature specific illuminator 540 in combination with sensor 130 and processor 132 thus constitutes a preferred embodiment of an image generator, providing an image of object 1108 including substrate 1109 and copper region 1110.

Computer 144 may include a user interface, enabling a user to identify the feature of interest in the feature specific image, such as copper region 1110 in FIG. 8A. It is appreciated that the feature of interest may be identifiable by a user as well as preferably being a machine identifiable feature, the presence of which machine identifiable feature in the feature specific image may be detected based on the appearance thereof, irrespective of the shape of the feature. It is appreciated that computer 144 therefore may operate both as a target identifier, enabling a user to identify a machine identifiable feature, and as a feature detector, for preferably automatically identifying the machine identifiable feature.

In the second mode of operation of range differentiator 120, following the generation of a segmented depth differentiated image, such as that shown in FIG. 8B, object 1108 is preferably imaged by camera sensor 130 under illumination conditions best suited for generating a depth profile of the feature of interest, which feature of interest is here embodied as copper region 1110.

During the imaging of object 1108 under lighting provided by feature focusing illuminator 150, the vertical position of lens 124 with respect to object 1108 is preferably incrementally shifted, such that focal height of lens 124 with respect to object 1108 is correspondingly adjusted. Adjustment of lens 124 may be controlled by controller 128, which controller 128 is preferably operative to incrementally move stage 126, and thereby lens 124, with respect to object 1108. Additionally or alternatively, the focal height of lens 124 with respect to object 1108 may be adjusted by way of adjustment to the height of table 106 and/or of optical head 102 in its entirety.

For each position of lens 124, an image of object 1108 is preferably acquired by sensor 130. A series of images at a range of focal heights of lens 124 above object 108 is thus preferably generated. An image focus analyzer, preferably embodied as processor 132, is preferably operative to perform image focus analysis on the series of images, in order to provide a focus score based on portions of each image and to ascertain a focus distance based on the focus score. It is appreciated that processor 132 thus preferably operates as a focus distance ascertainer, ascertaining a focus distance based on a differentiated image, such as the image of FIG. 8B.

It is appreciated that the focus score may be calculated based only on those portions of the depth differentiated image, such as the image of FIG. 8B, at a depth at or above a predetermined depth threshold, in the case of protruding copper traces 1110. Alternatively, the focus score may be calculated based only on those portions of the depth differentiated image at depths below a predetermined depth threshold, for example in the case of copper traces 1110 being embedded within substrate 1109.

In this case, a focus score is preferably calculated on a pixel by pixel basis in each of the images acquired under lighting conditions provided by feature focusing illuminator 150, the focus score being calculated only for those pixels identified in the segmented depth differentiated image, such as the image of FIG. 8B, as corresponding to regions of interest. It is appreciated that in order to generate a range image, the focus score is preferably calculated for each pixel, in order to ascertain the optimum focal height corresponding to maximum measured feature texture in that pixel. It is noted that in contrast to the focal score calculation described hereinabove with reference to system 100, an overall focus score, based on the sum of the focus scores of all the pixels in the region of interest in each image, is preferably not calculated in this embodiment.

In the case of copper region 1110 on substrate 1109, by way of example, each pixel identified in the depth differentiated image, such as the image of FIG. 8B, as corresponding to copper region 1110 is assigned a focus score based on an appropriate local texture measure such as the gradient magnitude or any other suitable focus measure known in the art. Pixels in the depth differentiated image, such as the image of FIG. 8B, identified as regions of non-interest, corresponding to substrate 1109 in the illustrated embodiment, are assigned a focus score of zero. It is appreciated that the focus score is not calculated for those portions of each image below the predetermined brightness threshold, which portions in this case correspond to substrate 1109.

Figure 9:
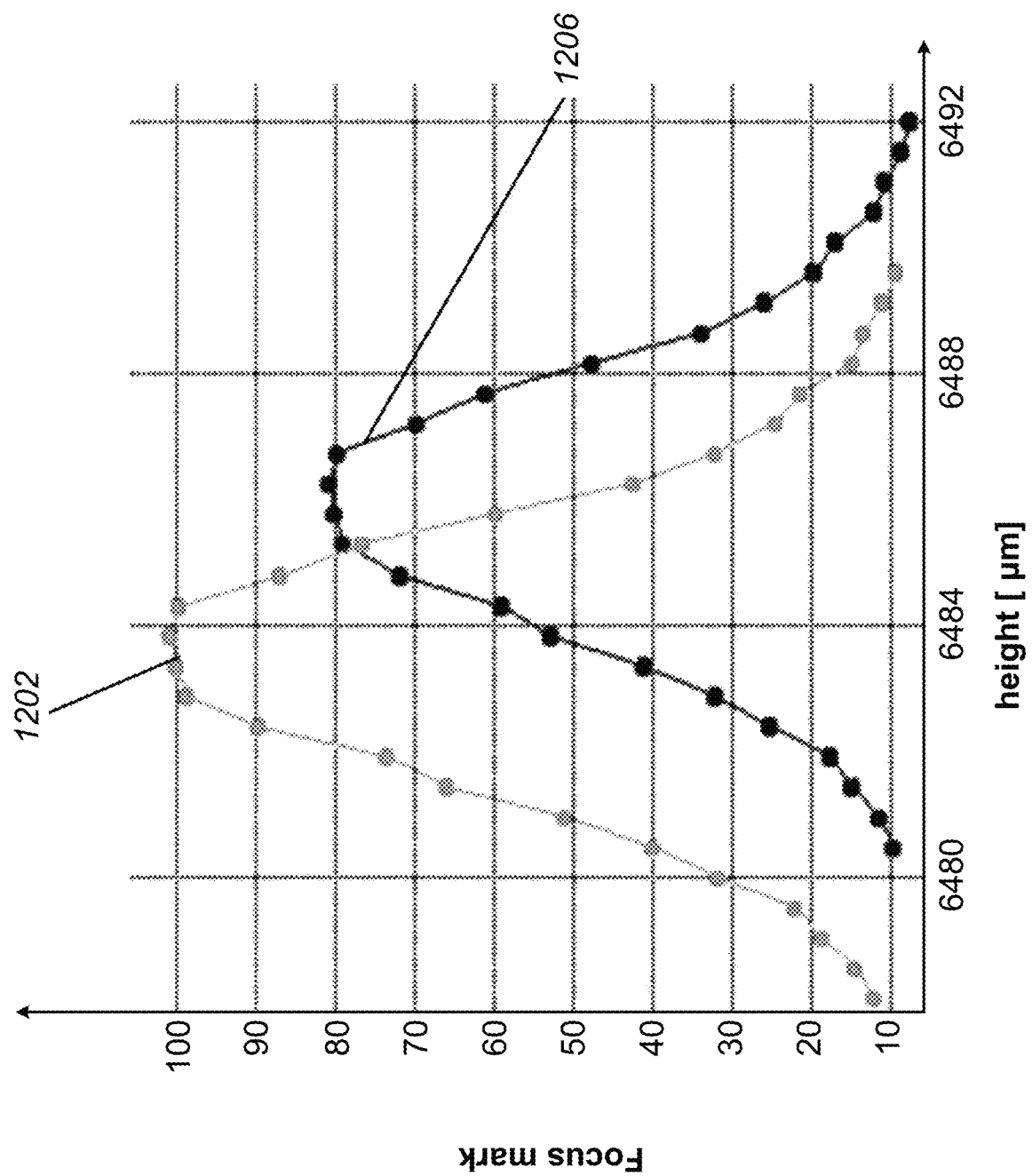
FIG. 9 is a simplified graph illustrating trends in variables useful for generating the auto-focused image of the type shown in FIG. 8C.

The focus score obtained for each pixel may be plotted as a function of the focal height of lens 124, as illustrated in FIG. 9. As seen in FIG. 9, a first trace 1202 represents variation of focal score with focal height in the case of a pixel corresponding to a first indent 1204 seen in FIG. 8A, wherein a highest focal score of 100 is seen to correspond to an absolute focal height of approximately 6486 μm. As further seen in FIG. 9, a second trace 1206 represents variation of focal score with focal height in the case of another pixel corresponding to a second indent 1208. In this case, second indent 1208 is not as deep as first indent 1204 represented by first trace 1202. As is appreciated from a comparison of first and second traces 1202 and 1206, the height at which the maximal focal score in the case of the second indent 1208 occurs is shifted with respect to that of the first indent 1204 due to the differences in depth therebetween.

Based on functions such as those illustrated in FIG. 9, a height image may be created wherein each pixel is assigned a value equal to the focal height at which that pixel was found to have its highest focus score. Such a height image is shown in FIG. 8C where the gray color scale corresponds to the pixel height in microns. As seen in FIG. 8C, gray pixels in region 1110 represent higher regions and white pixels in regions 1204 and 1208 represent lower regions. Black pixels in region 1109 correspond to pixels for which no focus score was calculated, since these pixels were identified as belonging to regions of non-interest, based on the segmented depth differentiated image, such as the image of FIG. 8B.

It is appreciated that the height or range image of FIG. 8C may be further analyzed in order to find the depth of indents 1204 and 1208 relative to the bulk of copper region 1110.

It is understood that in the above-described approaches, the focal metric based on which autofocusing is achieved is applied to the features of interest only and is preferably confined within the boundaries of the features of interest. This is in contrast to conventional autofocusing methods wherein a focal metric is typically derived over the entire field of view of a camera and is thus heavily influenced by the shape and size of various features, rather than by depth alone, as is the case in the present invention.

Figure 10:
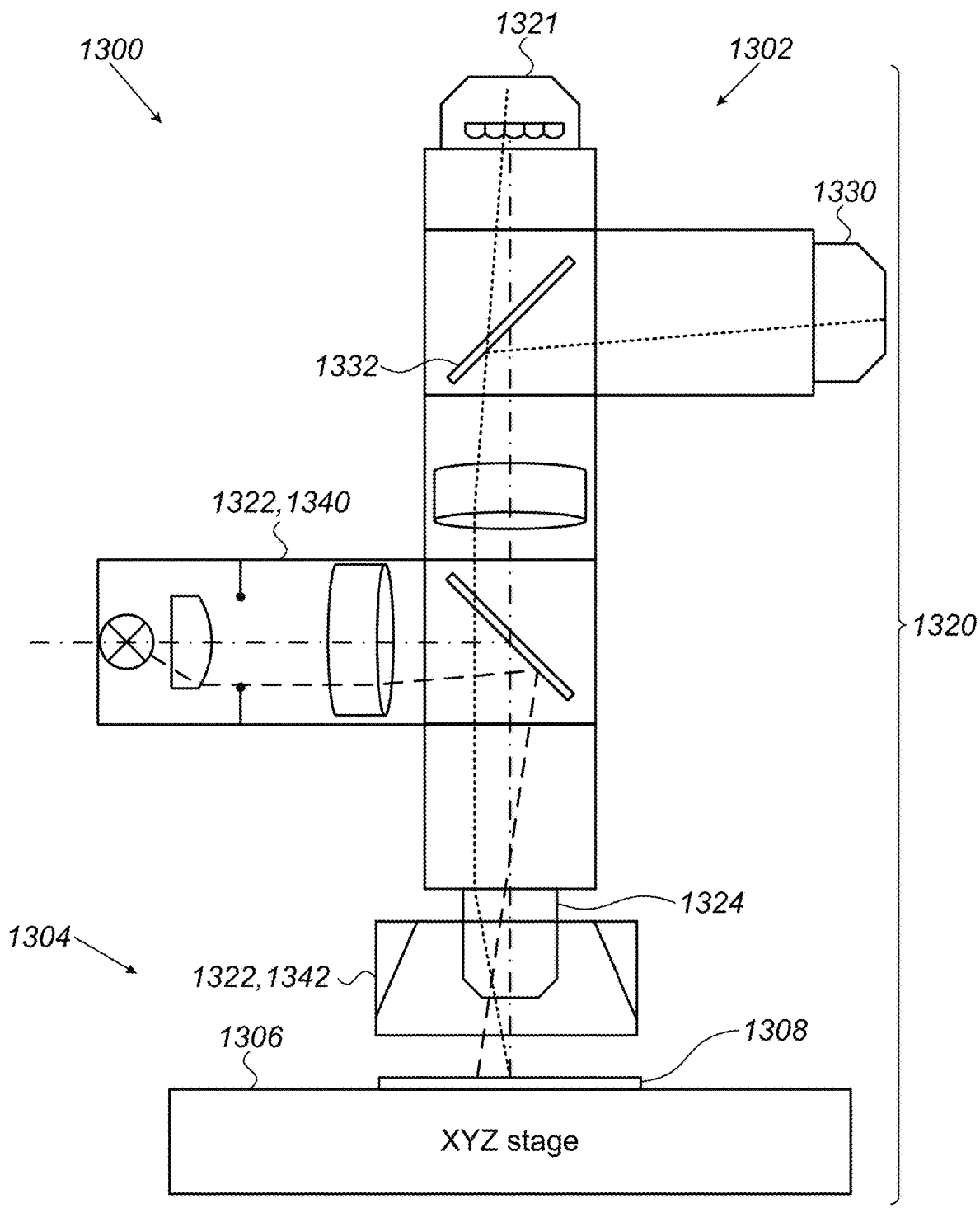
FIG. 10 is a simplified schematic illustration of an optical processing system including auto-focusing functionality, constructed and operative in accordance with a further preferred embodiment of the present invention.

Reference is now made to FIG. 10, which is a simplified schematic illustration of an optical processing system including depth differentiating functionality, constructed and operative in accordance with a further preferred embodiment of the present invention.

As seen in FIG. 10, there is provided an optical imaging system 1300, preferably including an optical imaging head 1302 mounted on a chassis 1304. Chassis 1304 preferably includes a table 1306 adapted for placement thereon of an object 1308 to be imaged. Optical imaging system 1300 is preferably operative to provide a depth profile image of object 1308, for example for the purposes of inspection or processing of object 1308.

Object 1308 is preferably a non-planar object comprising physical features at more than one physical depth. Here, by way of example, object 1308 is shown to be embodied as a PCB including a non-conductive substrate 1309 having metallic traces 1310 formed thereon, which metallic traces 1310 may be embedded or may protrude with respect to a surface of substrate 1309. It is appreciated, however, that optical imaging head 1302 may be used to acquire images of any suitable target or scene having physical features at more than one physical height or depth including, but not limited to, PCBs, wafer dies, assembled PCBs, flat panel displays and solar energy wafers.

For inspection purposes, it is often desirable to generate a two-dimensional image of object 1308, wherein the metallic traces 1310 are clearly distinguished from substrate 1309 based on differences in optical properties therebetween.

In some cases, it may also be desirable to generate a three-dimensional depth profile of a feature of interest included in object 1308, which feature of interest is at a different physical height or depth with respect to other features of object 1308. For example, in the case of substrate 1309, it may be desirable to generate a depth profile image of metallic traces 1310 for the purposes of inspection thereof.

It is a particular feature of a preferred embodiment of the present invention that optical imaging system 1300 includes a combined 2D spatial and 3D range differentiator 1320 providing both spatially segmented and depth differentiated images of a feature of interest, such as metallic traces 1310, notwithstanding the difference in physical depth between the feature of interest and other features, such as substrate 1309. Particularly preferably, range differentiator 1320 includes a 3D plenoptic camera 1321 for generating a depth profile image of the feature of interest.

Range differentiator 1320 preferably includes an image generator operative to provide an image of a scene at various physical depths, here embodied, by way of example, as including an illumination module 1322 for illuminating object 1308. Illumination provided by illumination module 1322 is preferably directed towards object 1308 by way of a lens portion 1324. Light emanating from object 1308 is preferably directed towards a two-dimensional imaging camera 1330, as well as towards plenoptic camera 1321, via a beam splitter 1332.

Illuminator module 1322 preferably operates in two modes, a 2D mode and a 3D mode. In a 2D mode of operation, object 1308 is preferably imaged by two-dimensional imaging camera 1330 under illumination conditions in which the feature of interest is clearly distinguishable from the other features of object 1308 having a different physical depth range than the feature of interest. Such illumination may be termed feature specific illumination and may be provided, by way of example only, by a bright field illuminator 1340 and a dark field illuminator 1342 included in illumination module 1322. Bright field illuminator 1340 of illumination module 1322 in combination with dark field illuminator 1342 of illumination module 1322 may be considered to comprise a first portion of an image generator, delivering combined bright field and dark field illumination modalities.

Figure 11B:
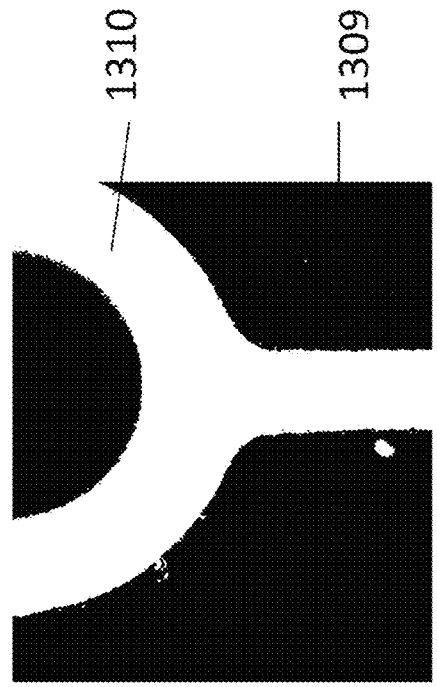
FIGS. 11A, 11B, 11C and 11D are simplified images produced by a system of the type illustrated in FIG. 10, respectively showing an initial image of an object acquired under feature-specific illumination conditions, a depth-differentiated image based on the initial image and useful for autofocusing, a two-dimensional auto-focused image based on the depth-differentiated image and a three-dimensional image.

Under a combination of bright and dark field illumination provided by bright field illuminator 1342 and dark field illuminator 1342, non-conductive substrate 1309 exhibits reduced reflectance in comparison with the reflectance exhibited by metallic traces 1310. An exemplary image of substrate 1309 and metallic traces 1310 thereon under feature specific dark and bright field illumination conditions is shown in FIG. 11A. As seen in FIG. 11A, non-conductive substrate 1309 has a dark appearance relative to the metallic traces 1310 due to the lower reflectance thereof whereas metallic traces 1310 have a lighter appearance relative to substrate 1309. Non-conductive substrate 1309 is thus clearly distinguishable from metallic traces 1310 in the image of FIG. 11A. Furthermore, as a result of the opacity of substrate 1309, additional layers of PCB 1308 that may lie beneath substrate 1309 are obscured and thereby do not appear in the image of FIG. 11A, thus simplifying subsequent image processing.

Following the generation of an initial feature specific image, such as that shown in FIG. 11A, a depth differentiated or segmented image is preferably generated, which segmented image is based on the initial feature specific image. An exemplary segmented image based on the feature specific image of FIG. 11A is illustrated in FIG. 11B. In the segmented image of FIG. 11B, pixels corresponding to bright metallic traces 1310 are marked in white, distinguishing these pixels from pixels corresponding to darker substrate regions 1309 which are marked in black. Preferably, a predetermined threshold for level of pixel brightness may be applied in order to distinguish between bright pixels corresponding to metallic traces 1310 and darker pixels corresponding to background substrate 1309.

It is understood that the segmented image of FIG. 11B thus effectively forms a depth differentiated image, in which those portions of the feature specific image of FIG. 11A at depths below a predetermined threshold, here, by way of example corresponding to substrate 1309, are distinguished from those portions of the feature specific image of FIG. 11A at depths above a predetermined threshold, here, by way of example, corresponding to metallic traces 1310. It is appreciated that the differentiation between portions of the feature specific image of FIG. 11A at different physical depths is based on the difference in optical properties therebetween, and more specifically the difference in reflectance under dark and bright field illumination therebetween, and is independent of the physical shapes of the features.

The generation of the segmented mask image of FIG. 11B may be automatically carried out by computing functionality included in a processor (not shown) forming part of system 1300. It is appreciated that the processor thus preferably operates as a depth differentiator, operative to distinguish portions of an initial feature specific image obtained under illumination by a first imaging modality, such as the image of FIG. 11A, at depths below a predetermined threshold, irrespective of a shape of the portions, and to provide a depth differentiated image, such as the depth differentiated image of FIG. 11B.

It is appreciated that the feature of interest may be identifiable by a user in the feature specific images of FIGS. 11A and 11B as well as preferably being a machine identifiable feature, the presence of which machine identifiable feature in the feature specific images may be detected based on the appearance thereof, irrespective of the shape of the feature.

In the 3D mode of operation of system 1300, following the generation of a segmented image such as that shown in FIG. 11B, object 1308 is preferably imaged by plenoptic camera 1321 under illumination conditions best suited for enhancing the imaged texture of the feature of interest, here embodied as metallic traces 1310. Such illumination may be termed feature focusing illumination and is preferably provided here by dark field illuminator 1342. Dark field illuminator 1342 may be considered to comprise a second portion of an image generator, delivering a dark field illumination modality to object 1308.

Figure 11D:
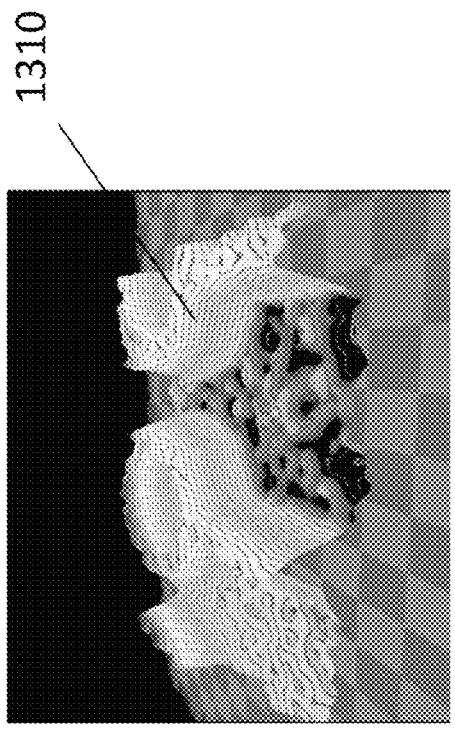
Figure 11A:
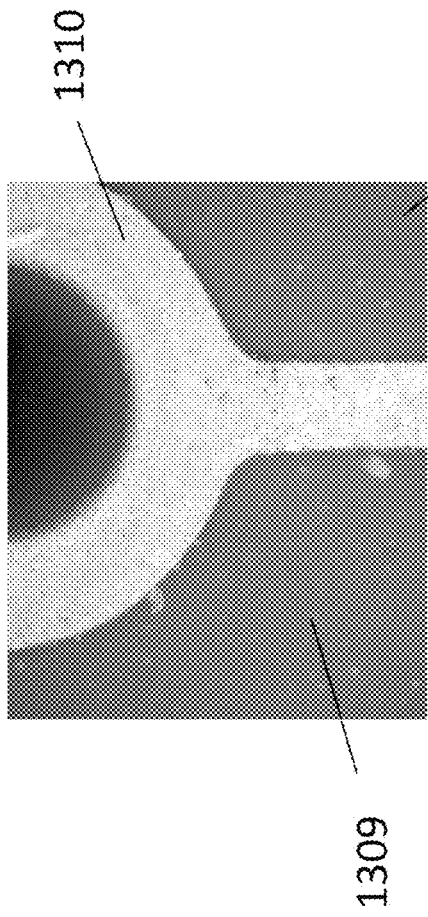
Figure 11C:
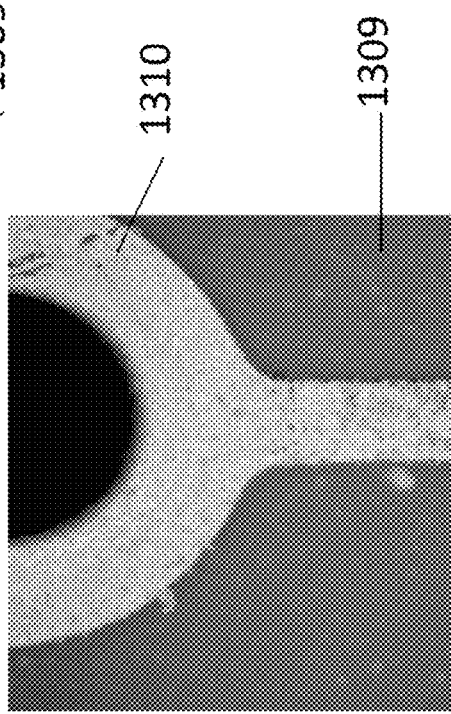

An exemplary image illustrating the appearance of metallic traces 1310 under dark field illumination only, in which a heightened texture of metallic traces 1310 is visible, in shown in FIG. 11C.

It is appreciated that although dark field illuminator 1342 is described herein as contributing both to the feature specific illumination and feature focusing illumination, the feature specific illumination and feature focusing illumination may alternatively be provided by disparate illumination elements not having overlapping functionality.

Furthermore, it is appreciated that the image generation functionality of range differentiator 1320 is not limited to the particular camera and illumination components described herein and rather may comprise any suitable components functional to generate an image of a scene at various physical depths, in which features having different physical depths are differentiable based on the optical properties thereof and irrespective of the shape thereof.

In an exemplary embodiment, plenoptic camera 1321 preferably provides a depth profile image of those portions identified as being suspected defects based on the 2D segmented image, such as the image of FIG. 11B. It is appreciated that the nature of certain suspected defects identifiable in a 2D segmented image of the type shown in FIG. 11B may be better ascertained by way of a depth profile image, as the true nature and criticality of the suspected defect is often only revealed upon identifying its 3D profile. Efficient 2D segmentation typically requires, in addition to generating brightness differences between the substrate 1309 and metallic traces 1310, suppressing the texture of the metal traces. This is achieved by a proper combination and careful balancing of both bright and darkfield illuminations. In contrast, 3D profiling by the plenoptic camera 1321 is strongly dependent on surface texture, for example in deriving stereo disparity between adjacent micro images. Using darkfield illumination alone maximizes the contrast of the surface texture of both the metallic traces 1310 and the substrate 1309, leading to accurate depth rendering by plenoptic camera 1321.

An exemplary image illustrating a depth profile of metallic traces 1310 as acquired by plenoptic camera 1321 under dark field illumination provided by dark field illuminator 1342 is shown in FIG. 11D. It is appreciated that although the field of view over which the depth profile of FIG. 11D is acquired is greater than that of the initial and segmented images of FIGS. 11A, 11B and 11C, the depth profiling of metallic traces 1310 may alternatively be confined to a smaller portion of the metallic traces 1310, such as in the region of a suspected defect, in order to ascertain the nature of the defect and classify the defect accordingly. In this case, the processor may operate as a focus distance ascertainer, ascertaining the focus distance at each point for depth profiling of a region in which a suspected defect lies, based on the depth differentiated image, such as the image of FIG. 11B.

In another preferred mode of operation of the combined 2D spatial and 3D depth range differentiator 1320, plenoptic camera 1321 may be employed to automatically focus 2D camera 1330 prior to acquiring of the 2D image thereby.

Figure 12B:
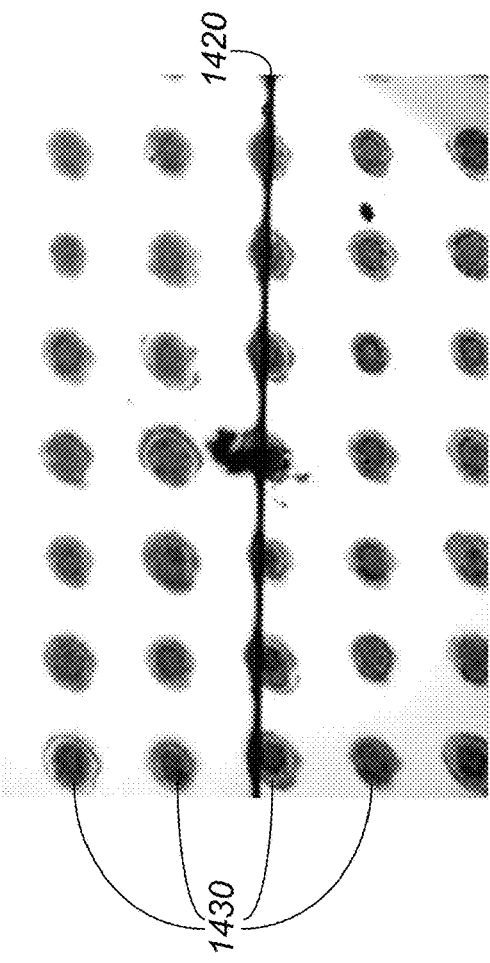
FIGS. 12A, 12B, 12C and 12D are simplified images additionally or alternatively produced by a system of the type illustrated in FIG. 10, respectively showing an initial three-dimensional image of an object acquired under feature-focusing illumination conditions, a corresponding two-dimensional image, a depth-differentiated three-dimensional image based on the initial image and a two-dimensional auto-focused image based on the depth-differentiated three-dimensional image.
Figure 12D:
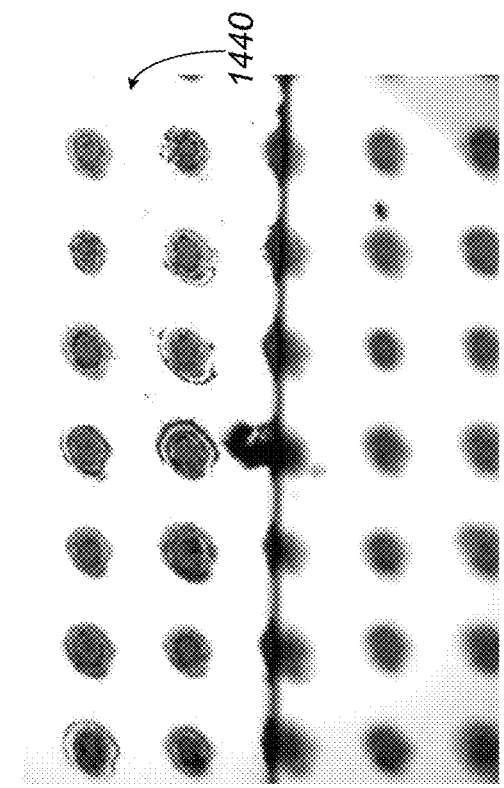
Figure 12A:
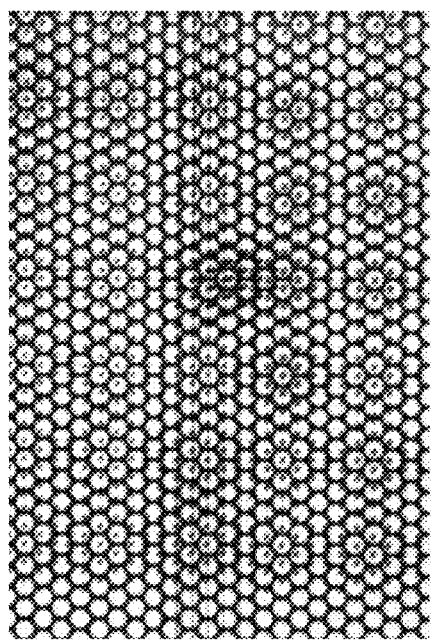

In this autofocusing mode, the inspected object 1308 is preferably initially brought to a coarse focus of plenoptic camera 1321 under feature-focusing illumination conditions, such as dark field illumination conditions preferably provided by dark field illuminator 1342. Such a preliminary coarse focus may be based on system optimization and engineering parameters and may involve pre-calibration of system 1300, as is well known by those skilled in the art. FIG. 12A shows an exemplary coarsely focused image of a substrate 1410, as acquired by plenoptic camera 1321. In the illustrated embodiment, substrate 1410 is a silicon wafer, containing an abrupt height step 1420, with laser inscribed pits 1430 thereon. A corresponding out-of-focus 2D image as received by 2D camera 1330 is shown in FIG. 12B.

Figure 12C:
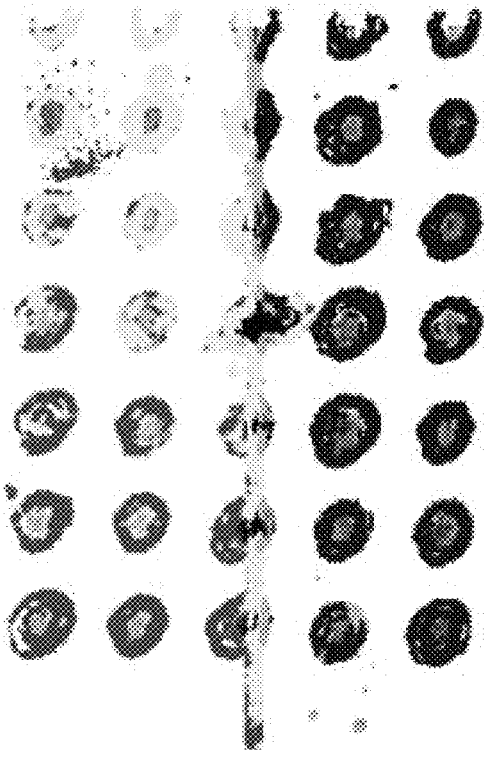

The coarsely focused image acquired by plenoptic camera 1321 may then be processed by computing functionality included in the processor of system 1300, in order to derive a depth profile of the instant field of view of substrate 1410. An exemplary depth differentiated profile image based on the coarsely focused image of FIG. 12A is shown in FIG. 12C. It is appreciated that, in contrast to the example illustrated in FIGS. 11A-11D, in this mode of operation of range differentiator 1320, the bright field illumination modality provided by bright field illuminator 1340 preferably constitutes a first imaging illumination modality, under which illumination a depth differentiable image is preferably acquired.

Based on the depth profile image of FIG. 12C, the feature depth at which 2D camera 1330 should optimally be focused may be selected. By way of example, in the case of substrate 1410, the optimal focal depth of 2D camera 1330 may be that depth corresponding to the height of the upper side 1440 of the step in the silicon wafer in the image of FIG. 12C. As is appreciated by one skilled in the art, the depth of focus of plenoptic camera 1321 typically straddles the depth of field of 2D camera 1330 and may be in the range of 2-4 times greater, such that the accuracy of the depth profile analysis based on the plenoptic image of FIG. 12A is at least as good as the accuracy achievable based on the depth of focus on lens 1324.

2D camera 1330 may then be automatically focused on the upper side 1440 of the silicon step at the optimal focus depth identified based on the depth profile image of FIG. 12C and a focused 2D image of substrate 1410 correspondingly acquired under feature specific bright field illumination conditions. It is noted that in this case the focus specific illumination is the same as the feature specific illumination. This is a consequence of the optical reflection properties of both the silicon wafer and the laser formed pits on its surface. An exemplary automatically focused 2D image acquired under feature specific bright field illumination conditions is shown in FIG. 12D.

It is appreciated that following the automatically focused 2D imaging, additional 3D plenoptic imaging of object 1308 may be performed if necessary, for example for the purpose of better classifying the nature of suspected defects present in the 2D autofocused image, as described hereinabove with reference to FIGS. 11C and 11D.

Figure 13:
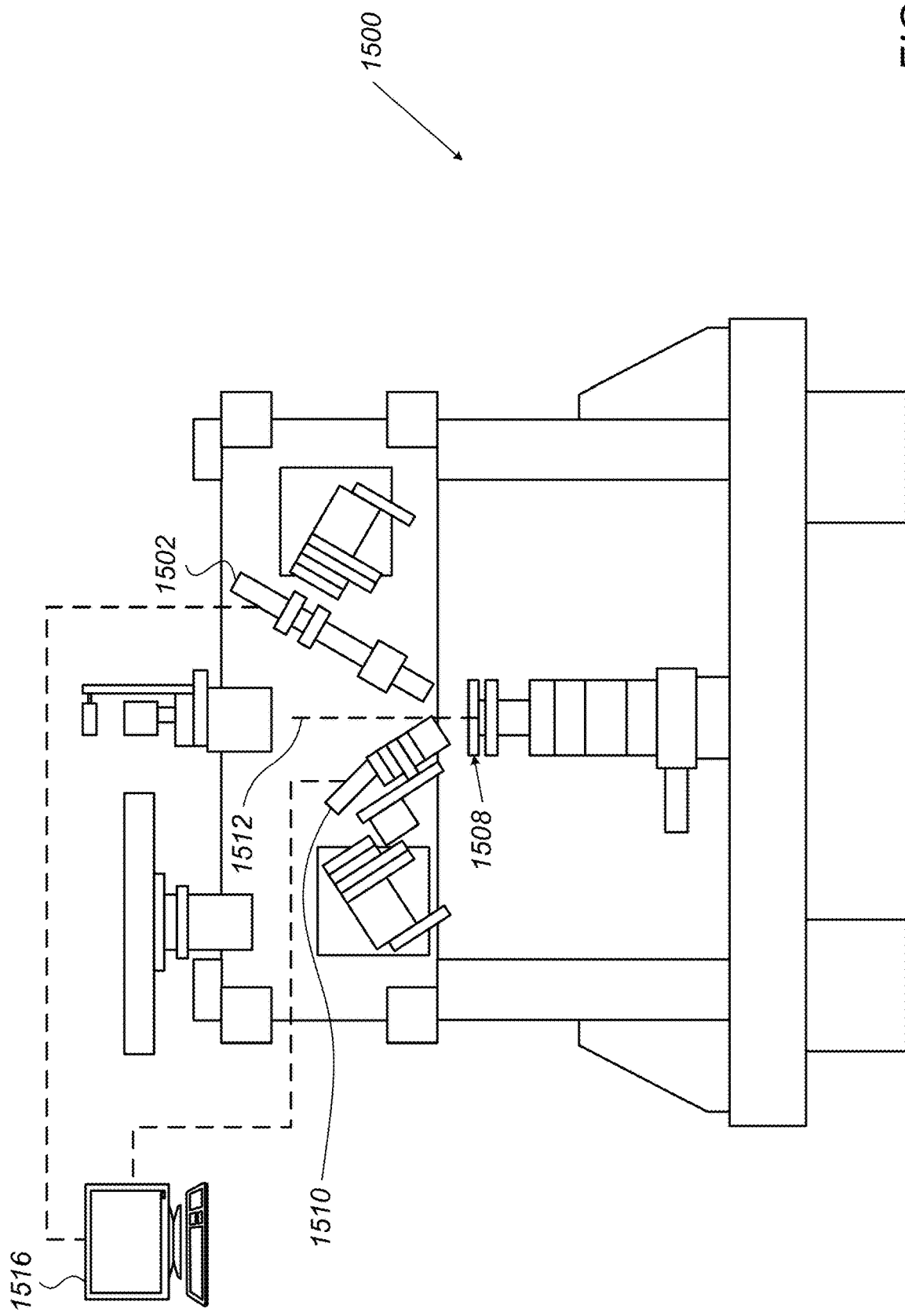
FIG. 13 is a simplified schematic illustration of an optical processing system including auto-focusing functionality, constructed and operative in accordance with a yet further preferred embodiment of the present invention.
Figure 14A:
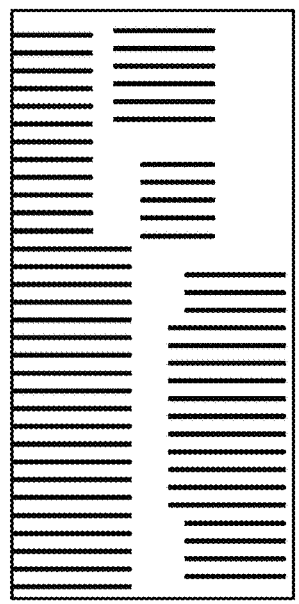
FIGS. 14A, 14B and 14C are simplified images produced by a system of the type illustrated in FIG. 13, respectively showing an initial image of an object acquired under first illumination conditions and two-dimensional and three-dimensional height-mapped images based on the initial image and useful for auto-focusing.
Figure 14B:
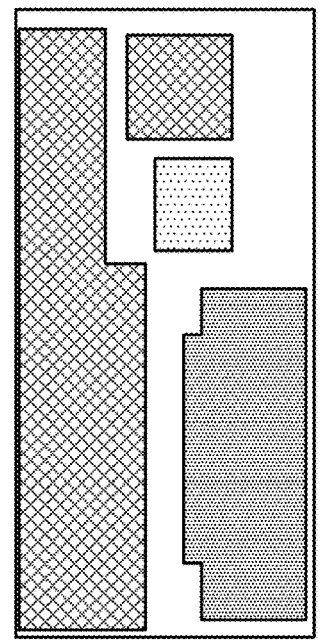
Figure 14C:
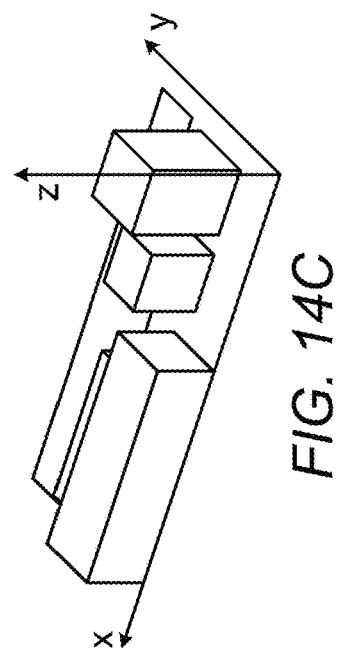

Reference is now made to FIG. 13, which is a simplified illustration of an optical processing system including autofocusing functionality, constructed and operative in accordance with a further preferred embodiment of the present invention, and to FIGS. 14A-14C, which are simplified examples of images produced by a system of the type illustrated in FIG. 13.

As seen in FIG. 13, there is provided an optical imaging system 1500 including a projector module 1502 operative to project a pattern onto an object 1508. Imaging system 1500 further preferably includes a camera sensor module 1510 operative to acquire an image of object 1508 when a pattern is projected thereon by projector module 1502. Preferably, projector module 1502 and camera module 1510 are angled with respect to a longitudinal axis 1512 defined with respect to object 1508. Projector module 1502 in combination with camera module 1510 may be considered to form an image generator, operative to generate an image of object 1508.

Object 1508 is preferably a non-planar object comprising physical features at more than one physical depth including, but not limited to, PCBs, wafer dies, assembled PCBs, flat panel displays and solar energy wafers. Alternatively, object 1508 may be embodied as any object or scene containing features at a range of physical depths.

In some cases, it may be desirable to generate a focused image of a feature of interest included in object 1508, which feature of interest is at a different physical height or depth with respect to other features of object 1508. This may be automatically achieved in system 1500 by way of projecting a regularly repeating pattern, such as a sinusoidal or binary moiré fringe pattern, onto a surface of object 1508 and analyzing the shift in phase of the projected fringes, as is detailed herein below.

The operation of system 1500 may be best understood with reference to the images generated thereby, examples of which images are presented in FIGS. 14A-14C.

Turning now to FIG. 14A, an image of a fringe pattern 1600, preferably projected by projector module 1502 onto a surface of object 1508, is illustrated. As seen in FIG. 14A, fringe pattern 1600 undergoes variable phase shifts depending on the surface topology of the features on object 1508 upon which the fringe pattern falls. Computing functionality included in a processor 1516 forming part of system 1500 may be operative to compute, preferably in real time, the phase shift in fringe pattern 1600 in order to derive at least the height of the physical feature upon which the fringe pattern is projected. Processor 1516 may be operative as a depth differentiator, for differentiating portions of the images acquired by camera module 1510 at various physical heights, irrespective of the shape thereof. Fringe phase shift analysis carried out by computing functionality included in processor 1516 may include, by way of example, a windowed Fourier transform. Additionally, processor 1516 may also control the generation of fringe patterns projected by projector module 1502.

The height of the physical feature is preferably computed relative to the height of a reference target incorporated in system 1500. The height of the reference target may be calibrated with respect to an additional imaging functionality (not shown) of system 1500 maintained in focus relative to object 1508 or may be calibrated with respect to camera sensor 1510.

A two-dimensional height map and a three-dimensional height map of object 1508 based on the projected fringe map of FIG. 14A are respectively illustrated in FIGS. 14B and 14C. As seen in FIGS. 14B and 14C, the shifts in phase of the projected fringe pattern may be used as a basis for segmenting object 1508 according to the relative heights of the physical features responsible for producing the corresponding shifts in the phase pattern. A feature of given height may thus be selected for optimum focusing thereupon, whilst features at heights other than the selected height are effectively ignored in subsequent image focusing. It is appreciated that the height maps of FIGS. 14B and 14C thus constitute segmented or depth differentiated images, based on which a depth of features selected for optimum focus thereon may be ascertained. Based on height selection alone, autofocusing of camera 1510 may thus be performed on features at a given height level, irrespective of a shape of those features. The optimum focus distance may be ascertained by way of processor 1516 based on the depth differentiated images of FIGS. 14B and 14C.

It is appreciated that the optimum spatial frequency of the fringe pattern projected by projector module 1502 is preferably set by taking into account and balancing several opposing requirements. The spatial frequency of the fringe pattern is preferably selected so as to be low enough to allow projection and imaging thereof with good contrast. In addition, the spatial frequency of the fringe pattern is preferably selected so as to be high enough to allow sufficiently high resolution height differentiation. Furthermore, the inter-fringe spacing within the fringe pattern is preferably selected so as to be large enough to encompass the full expected depth of object 1508 without phase ambiguity. Preferably, the fringe pattern has a sufficiently low spatial frequency such that shifts in phase thereof may be uniquely correlated to the physical depths giving rise to such shifts, without phase ambiguity.

At least these various factors are preferably balanced in order to derive the optimum spatial frequency of the fringe pattern for a particular imaging application.

System 1500 may be particularly well-suited for use in a closed-loop tracking autofocus mode, wherein object 1508 is preferably scanned continuously. In a continuous scanning mode, projector module 1502 is preferably strobed so as to operate in a pulsed mode, preferably in synchronization with the operation of camera module 1510. Alternatively, projector module 1502 may operate continuously, preferably in conjunction with a globally shuttered camera module 1510.

In use of system 1500 for continuous closed loop autofocusing operation, various operational parameters of system 1500 are preferably optimized. The temporal rate at which the height of object 1508 is sampled, by way of the projection of fringe pattern 1600 thereon and subsequent analysis of phase shifts thereof, is preferably selected so as to be sufficiently high to be suited to the scanning speed of object 1508 and the rate of height variations thereof. The operational frame rate of camera module 1510 is preferably set in accordance with the height sampling rate.

Additionally, the elapsed time between fringe image acquisition by camera module 1510 and the obtaining of an analyzed height map, which time delay may be termed the system latency, is preferably optimized. The system latency may be primarily dependent on the computing performance of a system controller of system 1500. The system latency is preferably set so as to be sufficiently short in order to avoid an excessive lag in the operation of the autofocusing functionality following the fringe image acquisition, which excessive lag would otherwise lead to focusing errors of the imaging functionality.

In certain embodiments of the present invention, the pixel resolution of camera module 1510 may be set so as to optimize the performance of system 1500. The fewer the imaging pixels of camera 1510, the higher the camera frame rate operation and the shorter the processing time. Additionally or alternatively, rather than computing the phase shift over the entirety of the images acquired by camera module 1510, the phase shift may only be computed within sparsely selected regions inside the image frames outputted by camera module 1510, whereby processing time may be accelerated. The number, size, aspect ratio and spacing of those regions within which the phase shift is computed may be selected by taking into account physical or other characteristics of object 1508.

It will be appreciated by persons skilled in the art that the present invention is not limited by what has been particularly claimed hereinbelow. Rather, the scope of the invention includes various combinations and subcombinations of the features described hereinabove as well as modifications and variations thereof as would occur to persons skilled in the art upon reading the forgoing description with reference to the drawings and which are not in the prior art.

The invention claimed is:

1. A range differentiator for auto-focusing, said range differentiator comprising:
   an image generator providing an image of a scene at a plurality of physical depths, wherein said image generator comprises a feature specific illuminator for illuminating said scene during acquisition of said image;
   a depth differentiator distinguishing portions of said image at depths below a predetermined threshold, irrespective of a shape of said portions, and providing a depth differentiated image, wherein said depth differentiator is operative to distinguish between said portions of said image at depths below said predetermined threshold and portions of said image at depths at or above said predetermined threshold based on differences in optical properties therebetween under illumination by said feature specific illuminator, and wherein said predetermined threshold is a predetermined pixel brightness level;
   a focus distance ascertainer ascertaining a focus distance based on said depth differentiated image; and
   an image focus analyzer operative to provide a focus score based on portions of said image at a depth at or above said predetermined threshold, said focus distance ascertainer being operative to ascertain said focus distance based on said focus score, and wherein said focus score only uses pixels in a region of interest.

2. The range differentiator according to claim 1, wherein said focus distance ascertainer is operative to ascertain said focal distance based on one of:
   said portions of said image at depths below said predetermined threshold; and
   said portions of said image at a depth at or above said predetermined threshold.

3. The range differentiator according to claim 1, wherein said feature specific illuminator comprises a UV illumination source and said depth differentiator is operative to distinguish between said portions of said image based on differences in fluorescence therebetween.

4. The range differentiator according to claim 1, wherein said feature specific illuminator comprises dark field and bright field illumination sources and said depth differentiator is operative to distinguish between said portions of said image based on differences in reflectance therebetween.

5. The range differentiator according to claim 4, wherein said image generator comprises a camera and said depth differentiated image comprises a two-dimensional image of said scene.

6. The range differentiator according to claim 1, wherein said image generator comprises a plenoptic camera and said depth differentiated image comprises a three-dimensional image of said scene.

7. The range differentiator according to claim 6, wherein said feature specific illuminator comprises a dark field illuminator.

8. The range differentiator according to claim 1, wherein said image focus analyzer comprises an illuminator for illuminating said scene with illumination for adjusting an imaged texture of said portions of said image at a depth at or above said predetermined threshold.

9. The range differentiator according to claim 8, wherein said illuminator comprises a dark field illuminator.

10. The range differentiator according to claim 1, and wherein said focus score is assigned irrespective of a shape of said portions.

11. The range differentiator according to claim 1, and wherein said focus score is individually assigned for each pixel corresponding to said portions of said image at a depth at or above said predetermined threshold.

12. The range differentiator according to claim 1, and wherein said portions of said image at a depth at or above said predetermined threshold are machine identifiable.

13. The range differentiator according to claim 1, wherein said image generator comprises a projector projecting a repeating pattern onto said scene and said depth differentiator comprises a phase analyzer operative to analyze shifts in phase of said repeating pattern and derive a map of said physical depths based on said shifts in phase, said map forming said depth differentiated image.

14. The range differentiator according to claim 13, wherein said focus distance ascertainer is operative to ascertain said focus distance based on at least one of said physical depths.

15. The range differentiator according to claim 13, wherein said repeating pattern comprises at least one of a sinusoidal repeating pattern and a binary repeating pattern.

16. The range differentiator according to claim 15, wherein said repeating pattern has a spatial frequency such that said phase analyzer is operative to uniquely correlate said shifts in phase to said physical depths.

17. The range differentiator according to claim 15, wherein said map of said physical depths is one of a two dimensional map and a three dimensional map.

18. A range differentiator for auto-focusing, said range differentiator comprising:
   an image generator providing an image of a scene at a plurality of physical depths, wherein said image generator comprises a feature specific illuminator for illuminating said scene during acquisition of said image;
   a depth differentiator distinguishing portions of said image at depths below a predetermined threshold, wherein said depth differentiator is operative to distinguish between said portions of said image at depths below said predetermined threshold and portions of said image at depths at or above said predetermined threshold based on differences in optical properties therebetween under illumination by said feature specific illuminator, and wherein said predetermined threshold is a predetermined pixel brightness level;
   an image focus analyzer operative to provide a focus score based on portions of said image at a depth at or above said predetermined threshold, wherein said focus score only uses pixels in a region of interest; and
   a focus distance ascertainer ascertaining a focus distance based on said focus score.

19. The range differentiator according to claim 18, wherein said feature specific illuminator comprises a UV illumination source and said depth differentiator distinguishes portions of said image based on differences in fluorescence therebetween.

20. The range differentiator according to claim 18, wherein said feature specific illuminator comprises a combined dark field and bright field illuminator and said depth differentiator distinguishes portions of said image based on differences in reflectance therebetween.

21. The range differentiator according to claim 18, wherein said image focus analyzer comprises an illuminator for illuminating said scene with illumination for adjusting an imaged texture of said portions of said image at a depth at or above said predetermined threshold.

22. The range differentiator according to claim 21, wherein said illuminator comprises a dark field illuminator.

23. The range differentiator according to claim 21, wherein said illuminator and said feature specific illuminator share at least one common illumination component.

24. The range differentiator according to claim 18, and wherein said focus score is assigned irrespective of a shape of said portions.

25. The range differentiator according to claim 18, and wherein said focus score is individually assigned for each pixel corresponding to said portions of said image at a depth at or above said predetermined threshold.

26. The range differentiator according to claim 18, and wherein said portions of said image at a depth at or above said predetermined threshold are machine identifiable.

27. A range differentiator for auto-focusing, said range differentiator comprising:
   a target identifier comprising a user interface enabling a user to identify a machine identifiable feature of an object in an image;
   a feature specific illuminator for illuminating said object during acquisition of said image;
   a feature detector operative to identify at least one occurrence of said machine identifiable feature in an image irrespective of a shape of said feature, wherein said feature detector is operative to distinguish between at least one occurrence of said machine identifiable feature and other features based on differences in optical properties therebetween under illumination by said feature specific illuminator, and wherein said at least one occurrence is distinguished using a predetermined pixel brightness level;

a focus distance ascertainer ascertaining a focal distance to said machine identifiable feature; and an image focus analyzer operative to provide a focus score based on portions of said image at a depth at or above said predetermined threshold, said focus distance ascertainer being operative to ascertain said focus distance based on said focus score, and wherein said focus score only uses pixels in a region of interest.

28. The range differentiator according to claim 27, wherein said feature specific illuminator comprises a UV illumination source and said feature identifier identifies said machine identifiable feature based on fluorescence thereof.

29. The range differentiator according to claim 27, wherein said feature specific illuminator comprises a combined dark field and bright field illuminator and said feature identifier identifies said machine identifiable feature based on reflectance thereof.

30. The range differentiator according to claim 27, wherein range ascertainer comprises an illuminator for illuminating said object with illumination for adjusting an imaged texture of said feature of said object in said image.

31. The range differentiator according to claim 30, wherein said illuminator comprises a dark field illuminator.

32. The range differentiator according to claim 30, wherein said illuminator and said feature specific illuminator share at least one common illumination component.

33. The range differentiator according to claim 27, wherein said feature of said object comprises a conductive feature.

34. The range differentiator according to claim 33, wherein said feature of said object comprises an indent in said conductive feature.

35. A range differentiator for auto-focusing, said range differentiator comprising:

a first image generator comprising a first imaging modality and providing a first image of a scene at a plurality of physical depths, wherein said first image generator comprises a feature specific illuminator for illuminating an object during acquisition of said first image;

a depth differentiator distinguishing portions of said first image at depths below a predetermined threshold from portions of said first image at depths at or above said predetermined threshold based on differences in optical properties therebetween under illumination by said feature specific illuminator and providing a depth differentiated image, and wherein said predetermined threshold is a predetermined pixel brightness level;

a focus distance ascertainer ascertaining a focal distance based on said depth differentiated image;

an image focus analyzer operative to provide a focus score based on portions of said first image at a depth at or above said predetermined threshold, said focus distance ascertainer being operative to ascertain said focus distance based on said focus score, and wherein said focus score only uses pixels in a region of interest; and a second image generator comprising a second imaging modality and providing a second image of said scene automatically focused at said focal distance.

36. The range differentiator according to claim 35, wherein said first imaging modality comprises combined bright and dark field illumination and said second imaging modality comprises dark field illumination.

37. The range differentiator according to claim 36, wherein said second image generator comprises a plenoptic camera.

38. The range differentiator according to claim 35, wherein said first imaging modality comprises dark field illumination and said second imaging modality comprises combined bright and dark field illumination.

39. The range differentiator according to claim 38, wherein said first image generator comprises a plenoptic camera.

* * * * *